(12) United States Patent
Shiro et al.

(10) Patent No.: US 12,534,374 B2
(45) Date of Patent: Jan. 27, 2026

(54) SURFACE-MODIFIED NANODIAMOND AND METHOD FOR PRODUCING SURFACE-MODIFIED NANODIAMOND

(71) Applicant: DAICEL CORPORATION, Osaka (JP)

(72) Inventors: Daisuke Shiro, Tokyo (JP); Atsushi Kume, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 1108 days.

(21) Appl. No.: 17/611,613

(22) PCT Filed: Jun. 3, 2020

(86) PCT No.: PCT/JP2020/021924
§ 371 (c)(1),
(2) Date: Nov. 16, 2021

(87) PCT Pub. No.: WO2020/246500
PCT Pub. Date: Dec. 10, 2020

(65) Prior Publication Data
US 2022/0227633 A1    Jul. 21, 2022

(30) Foreign Application Priority Data
Jun. 5, 2019   (JP) .................... 2019-105065

(51) Int. Cl.
*C01B 32/26* (2017.01)
*B82Y 30/00* (2011.01)
(Continued)

(52) U.S. Cl.
CPC .............. *C01B 32/26* (2017.08); *C01B 32/28* (2017.08); *C08G 65/22* (2013.01); *C08G 65/329* (2013.01); *B82Y 30/00* (2013.01); *B82Y 40/00* (2013.01)

(58) Field of Classification Search
CPC ......... C01B 32/26; C01B 32/28; C08G 65/22; C08G 65/329; B82Y 30/00; B82Y 40/00; B01J 3/062
See application file for complete search history.

(56) References Cited

U.S. PATENT DOCUMENTS

| 8,410,186 B2 | 4/2013 | Komatsu et al. |
| 2010/0261926 A1 | 10/2010 | Komatsu et al. |

FOREIGN PATENT DOCUMENTS

| JP | 2010-248023 A | 11/2010 |
| JP | 2012-82103 A | 4/2012 |

OTHER PUBLICATIONS

Hsieh et al. "Bioorthogonal Fluorescent Nanodiamonds for Continuous Long-Term Imaging and Tracking of Membrane Proteins" ACS Appl. Mater. Interfaces, May 13, 2019, 11, 19774-19781 (Year: 2019).*

(Continued)

*Primary Examiner* — Anthony J Zimmer
*Assistant Examiner* — Syed T Iqbal
(74) *Attorney, Agent, or Firm* — Birch, Stewart, Kolasch & Birch, LLP

(57) ABSTRACT

Provided are: a polyglycerin-chain surface-modified nanodiamond having excellent dispersibility in a low-polarity solvent; and a method of producing the polyglycerin-chain surface-modified nanodiamond. A surface-modified nanodiamond 1 includes a nanodiamond particle 2 and a surface-modifying group 3 that surface-modifies the nanodiamond particle 2, the surface-modifying group 3 having a polyglycerin chain in which a hydrogen atom of at least some of the hydroxyl groups in the polyglycerin chain is substituted by a monovalent organic group.

19 Claims, 8 Drawing Sheets

(51) Int. Cl.
*B82Y 40/00* (2011.01)
*C01B 32/28* (2017.01)
*C08G 65/22* (2006.01)
*C08G 65/329* (2006.01)

(56) References Cited

OTHER PUBLICATIONS

Hsieh et al. "Bioorthogonal Fluorescent Nanodiamonds for Continuous Long-Term Imaging and Tracking of Membrane Proteins" ACS Appl. Mater. Interfaces 2019, 11, 19774-19781 (Year: 2019).*
Hsieh et al., "Bioorthogonal Fluorescent Nanodiamonds for Continuous Long-Term Imaging and Tracking of Membrane Proteins", ACS Applied Materials and Interfaces, vol. 11, May 13, 2019, pp. 19774-19781.
International Preliminary Report on Patentability and Written Opinion of the International Searching Authority for International Application No. PCT/JP2020/021924, dated Dec. 7, 2021, with English translation.
International Search Report for International Application No. PCT/JP2020/021924, dated Aug. 18, 2020, with an English translation.
Extended European Search Report for corresponding European Application No. 20819562.8, dated Sep. 15, 2023.
Li et al., "Preparation of clear colloidal solutions of detonation nanodiamond in organic solvents," Colloids and Surfaces A: Physiochemical and Engineering Aspects, vol. 353, 2010 (Available online Oct. 24, 2009), pp. 52-56.

* cited by examiner

SURFACE-MODIFIED NANODIAMOND AND METHOD FOR PRODUCING SURFACE-MODIFIED NANODIAMOND

TECHNICAL FIELD

The present disclosure relates to a surface-modified nanodiamond and a method for producing a surface-modified nanodiamond. The present application claims priority from the Japanese Patent Application No. 2019-105065, filed in Japan on Jun. 5, 2019, the contents of which are incorporated herein by reference.

BACKGROUND ART

Nano-sized fine substances are known to have novel characteristics that cannot be achieved in a bulk state. For example, nanodiamond particles (i.e., nano-sized diamond particles) exhibit mechanical strength, a high refractive index, thermal conductivity, insulating properties, antioxidation properties, and an action of promoting the crystallization of resins, and the like. However, nanodiamond particles typically have large proportions of surface atoms, a sum of van der Waals forces that can act between surface atoms of adjacent particles is strong, and aggregation tends to occur. In addition, in the case of nanodiamond particles, Coulomb interaction between crystalline surfaces of adjacent crystals may contribute to agglutination, which is a phenomenon where particles form a significantly firm cluster. Thus, it was extremely difficult to disperse nanodiamond particles to be in a state of primary particles in an organic solvent or in a resin. Therefore, the surface of nanodiamond particles is modified so as to impart dispersibility to the nanodiamond particles to suppress aggregation.

For example, surface-modified nanodiamonds in which a polyglycerin chain is introduced into the surfaces of nanodiamond particles are known to have excellent solubility or dispersibility in water or polar organic solvents (see Patent Documents 1 and 2).

CITATION LIST

Patent Documents

Patent Document 1: JP 2010-248023 A
Patent Document 2: JP 2012-82103 A

SUMMARY OF INVENTION

Technical Problem

However, in general, surface-modified nanodiamonds into which a polyglycerin chain is introduced have extremely high polarity; as a result, dispersion media that can be used have been limited to high-polarity solvents.

Therefore, an object of the present disclosure is to provide a polyglycerin chain-containing surface-modified nanodiamond having excellent dispersibility in a low-polarity solvent and a method of producing the polyglycerin chain-containing surface-modified nanodiamond.

Solution to Problem

As a result of diligent research to achieve the above object, the inventors of the present disclosure discovered that a polyglycerin chain-containing surface-modified nanodiamond having excellent dispersibility in a low-polarity solvent can be obtained by end-capping a terminal of the polyglycerin chain of the polyglycerin chain-containing surface-modified nanodiamond with an alcohol, an isocyanate ester, or a carboxylic acid chloride, when compared to a nanodiamond particle having a surface-modifying group containing a polyglycerin chain that has its terminal hydroxyl group with no end-capping. The present invention relates to what has been completed based on these findings.

That is, the present invention provides a surface-modified nanodiamond including a nanodiamond particle and a surface-modifying group that surface-modifies the nanodiamond particle, the surface-modifying group having a polyglycerin chain in which a hydrogen atom of at least some of the hydroxyl groups in the polyglycerin chain is substituted by a monovalent organic group.

The monovalent organic group is preferably a group represented by Formula (1) below:

In Formula (1), X represents a single bond, —C(=O)—, or —C(=O)—NH—. R represents a monovalent organic group, and an atom bonded to X is a carbon atom.

The surface-modifying group is preferably a polyglycerin chain-containing surface-modifying group represented by Formula (2) below:

In Formula (1), p and q each represent an average degree of polymerization for a repeating unit in parentheses, where p is a value of 0 or greater, q is a value of 0 or greater, and p+q is a value of 1 or greater. $R^1$ represents a monovalent organic group. [—$OR^2$] represents a terminal of a polyglycerin chain, where $R^2$ represents a hydrogen atom or a monovalent organic group, and when $R^2$ is a hydrogen atom, q represents a value greater than 0. Y represents a single bond or a divalent group, and a bond extending left from Y is bonded to the nanodiamond particle.

In Formula (1), R is preferably an alkyl group.
In Formula (1), R is preferably an alkyl group having from 1 to 18 carbons.
In Formula (1), R is preferably an ethyl group, a butyl group, or a hexyl group.

The surface-modified nanodiamond may have an absorption peak from around 1510 to 1540 $cm^{-1}$ and an absorption peak from around 1700 to 1730 $cm^{-1}$ in an FT-IR spectrum.

The surface-modified nanodiamond may have an absorption peak from around 1730 to 1750 $cm^{-1}$ in an FT-IR spectrum.

The surface-modified nanodiamond may have a peak from around 5 to 45 ppm, a peak from around 60 to 85 ppm, and a peak from around 140 to 200 ppm in a $^{13}$C-NMR spectrum.

The surface-modified nanodiamond preferably has a median size of from 5 to 100 nm upon dispersing the surface-modified nanodiamond in at least one organic dispersion medium having a Hildebrand solubility parameter (δ) of 10 $(cal/cm^3)^{1/2}$ or less such that a content ratio of the surface modified nanodiamond is 0.1 mass %.

The present disclosure also provides a method of producing the surface-modified nanodiamond, the method comprising reacting a surface-modified nanodiamond (A) with at least one compound selected from the group consisting of an alcohol (B1), an isocyanate ester (B2), and a carboxylic acid chloride (B3) to obtained the surface-modified nanodiamond, the surface-modified nanodiamond (A) including a nanodiamond particle and a surface-modifying group that surface-modifies the nanodiamond particle, the surface modifying group having a polyglycerin chain that contains a hydroxyl group.

Advantageous Effects of Invention

The surface-modified nanodiamond according to an embodiment of the present disclosure has excellent dispersibility in a low-polarity solvent when compared to a nanodiamond particle having a surface-modifying group containing a polyglycerin chain that has its terminal hydroxyl group with no end-capping.

DESCRIPTION OF EMBODIMENTS

Surface-Modified Nanodiamond

A surface-modified nanodiamond according to an embodiment of the present disclosure (hereinafter, nanodiamond may be referred to as "ND") includes a nanodiamond particle and a surface-modifying group that surface-modifies the nanodiamond particle, the surface-modifying group having a polyglycerin chain in which a hydrogen atom of at least some of the hydroxyl groups in the polyglycerin chain is substituted by a monovalent organic group. Note that, in the present specification, the surface-modifying group having a polyglycerin chain in which a hydrogen atom of at least some of the hydroxyl groups in the polyglycerin chain is substituted by a monovalent organic group may be referred to as "surface-modifying group (X)". The surface-modified ND may have only one type of surface-modifying group (X), or may have two or more types thereof.

Figure 1:
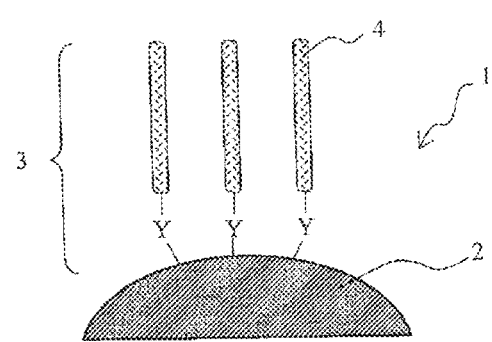
FIG. 1 is an enlarged schematic diagram illustrating an example of a surface-modified nanodiamond according to an embodiment of the present disclosure, where a surface-modified ND [1] has a surface-modifying group [3] having a polyglycerin chain [4] on the surface of an ND particle [2] (shown partially).

FIG. 1 is an enlarged schematic diagram illustrating an example of the surface-modified ND according to an embodiment of the present disclosure, where a surface-modified ND [1] has a surface-modifying group [3] (surface-modifying group [X]) having a polyglycerin chain [4], in which a hydrogen atom of at least some of the hydroxyl groups in the polyglycerin chain is substituted by a monovalent organic group, on the surface of an ND particle [2]. Note that Y in FIG. 1 is the same as Y in Formula (2) to be described below.

The ND particle constituting the surface-modified ND preferably contains a primary particle of the nanodiamond. In addition, a secondary particle in which several to dozens of the primary particles aggregated (agglutinated) may be included. Furthermore, the surface of the surface-modified ND may have one or more types of other surface functional groups (e.g., an amino group, a hydroxyl group, and a carboxyl group) in addition to the surface-modifying group (X).

The surface-modifying group (X) is a group having a polyglycerin chain in which a hydrogen atom of at least some of the hydroxyl groups in the polyglycerin chain is substituted by a monovalent organic group. That is, the monovalent organic group is bonded to an oxygen atom derived from a polyglycerin-chain terminal hydroxyl group. In the surface-modifying group (X), the polyglycerin chain may be bonded to the ND particle directly or via a divalent group. Examples of the divalent group include divalent groups listed as Y in Formula (2) to be described below.

Examples of the monovalent organic group include a substituted or unsubstituted hydrocarbon group (a monovalent hydrocarbon group), a substituted or unsubstituted heterocyclic group (a monovalent heterocyclic group), a group in which two or more of the aforementioned groups are bonded, and a group in which an aforementioned group is bonded with a joining group. The bonded group may be directly bonded or may be bonded via a linking group. Examples of the linking group include an amino group, an ether bond, an ester bond, a phosphinic acid group, a sulfide bond, a carbonyl group, an organic group-substituted amide group, an organic group-substituted urethane bond, an organic group-substituted imide bond, a thiocarbonyl group, a siloxane bond, and a group in which two or more of those listed above are bonded. Furthermore, the joining group is a group that joins to an oxygen atom derived from a polyglycerin-chain terminal hydroxyl group, and examples thereof include a group that is bonded to the oxygen atom to form an ester group and a group that is bonded to the oxygen atom to form a urethane bond (such as a carbamoyl group).

Examples of the hydrocarbon group of the monovalent organic group include, for example, an aliphatic hydrocarbon group, an alicyclic hydrocarbon group, an aromatic hydrocarbon group, and a group in which two or more of those listed above are bonded.

Examples of the aliphatic hydrocarbon group include an alkyl group, an alkenyl group, and an alkynyl group. Examples of the alkyl group include a $C_{1-20}$ alkyl group such as a methyl group, an ethyl group, a propyl group, an isopropyl group, a butyl group, a hexyl group, an octyl group, an isooctyl group, a decyl group, and a dodecyl group, preferably a $C_{1-10}$ alkyl group, and more preferably a $C_{1-4}$ alkyl group. Examples of the alkenyl group include a $C_{2-20}$ alkenyl group such as a vinyl group, an allyl group, a methallyl group, a 1-propenyl group, an isopropenyl group, a 1-butenyl group, a 2-butenyl group, a 3-butenyl group, a 1-pentenyl group, a 2-pentenyl group, a 3-pentenyl group, a 4-pentenyl group, and a 5-hexenyl group, preferably a $C_{2-10}$ alkenyl group, and more preferably a $C_{2-4}$ alkenyl group. Examples of the alkynyl group include a $C_{2-20}$ alkynyl group such as an ethynyl group and a propynyl group, preferably a $C_{2-10}$ alkynyl group, and more preferably a $C_{2-4}$ alkynyl group.

Examples of the alicyclic hydrocarbon group include: a $C_{3-12}$ cycloalkyl group, such as a cyclopropyl group, a cyclobutyl group, a cyclopentyl group, a cyclohexyl group, and a cyclododecyl group; a $C_{3-12}$ cycloalkenyl group, such as a cyclohexenyl group; and a $C_{4-15}$ crosslinked cyclic hydrocarbon group, such as a bicycloheptanyl group and a bicycloheptenyl group.

Examples of the aromatic hydrocarbon group include a $C_{6-14}$ aryl group, such as a phenyl group and a naphthyl group (especially, a $C_{6-10}$ aryl group).

Examples of the heterocycle forming the above heterocyclic group include an aromatic heterocycle and a non-aromatic heterocycle. Examples of such a heterocycle include a 3 to 10-membered ring (preferably a 4 to 6-membered ring) having a carbon atom and at least one heteroatom (for example, oxygen atom, sulfur atom, and nitrogen atom) as atoms constituting the ring, and a condensed ring thereof. Specific examples thereof include a heterocycle containing an oxygen atom as a heteroatom (for example, a 3-membered ring, such as an oxirane ring; a 4-membered ring, such as an oxetane ring; a 5-membered ring, such as a furan ring, a tetrahydrofuran ring, an oxazole ring, an isoxazole ring, and a γ-butyrolactone ring; a 6-membered ring, such as a 4-oxo-4H-pyran ring, a tetrahydropyran ring, and a morpholine ring; a condensed ring, such as a benzofuran ring, an isobenzofuran ring, a 4-oxo-4H-chromene ring, a chroman ring, and an isochroman ring; and a crosslinked ring, such as a 3-oxatricyclo[4.3.1.1$^{4,8}$]undecan-2-one ring and a 3-oxatricyclo[4.2.1.0$^{4,8}$]nonan-2-one ring), a heterocycle containing a sulfur atom as a heteroatom (for example, a 5-membered ring, such as a thiophene ring, a thiazole ring, an isothiazole ring, and a thiadiazole ring; a 6-membered ring, such as a 4-oxo-4H-thiopyran ring; and a condensed ring, such as a benzothiophene ring), and a heterocycle containing a nitrogen atom as a heteroatom (for example, a 5-membered ring, such as a pyrrole ring, a pyrrolidine ring, a pyrazole ring, an imidazole ring, and a triazole ring; a 6-membered ring, such as an isocyanuric ring, a pyridine ring, a pyridazine ring, a pyrimidine ring, a pyrazine ring, a piperidine ring, and a piperazine ring; and a condensed ring, such as an indole ring, an indoline ring, a quinoline ring, an acridine ring, a naphthyridine ring, a quinazoline ring, and a purine ring).

Furthermore, examples of the group in which an aliphatic hydrocarbon group and an alicyclic hydrocarbon group are bonded include a cyclohexylmethyl group and a methylcyclohexyl group. Examples of the group in which an aliphatic hydrocarbon group and an aromatic hydrocarbon group are bonded include a $C_{7-18}$ aralkyl group (especially, a $C_{7-10}$ aralkyl group), such as a benzyl group and a phenethyl group; a $C_{6-10}$ aryl-$C_{2-6}$ alkenyl group, such as a cinnamyl group; a $C_{1-4}$ alkyl-substituted aryl group, such as a tolyl group; and a $C_{2-4}$ alkenyl-substituted aryl group, such as a styryl group.

Examples of the group in which two or more of the aforementioned monovalent hydrocarbon group and/or the aforementioned monovalent heterocyclic group are bonded via a linking group include a group in which the aforementioned monovalent hydrocarbon group and/or the aforementioned monovalent heterocyclic group is bonded with an alkoxy group, an alkenyloxy group, an alkynyloxy group, an aryloxy group, an aralkyloxy group, an acyloxy group, an alkylthio group, an alkenylthio group, an arylthio group, an aralkylthio group, an acyl group, an alkenylcarbonyl group, an arylcarbonyl group, an aralkylcarbonyl group, an alkoxycarbonyl group, an alkenyloxycarbonyl group, an aryloxycarbonyl group, an aralkyloxycarbonyl group, a dialkylamino group, an acylamino group, an oxetanyl group-containing group, or a carbamoyl group, or, a group in which the aforementioned monovalent hydrocarbon group and/or the aforementioned monovalent heterocyclic group is bonded with a group in which two or more of the groups listed above are bonded.

The monovalent organic group may have a substituent. Examples of the substituent include: a halogen atom, such as a fluorine atom, a chlorine atom, a bromine atom, and an iodine atom; a hydroxyl group; a mercapto group; a carboxy group; an amino group; and an oxo group.

Among these, the monovalent organic group is preferably a group represented by Formula (1) below:

—X—R  (1)

In Formula (1), X represents a single bond, —C(=O)—, or —C(=O)—NH—. R represents a monovalent organic group, and an atom that is bonded to X is a carbon atom.

Examples of the monovalent organic group of R include a substituted or unsubstituted hydrocarbon group (a monovalent hydrocarbon group), a substituted or unsubstituted heterocyclic group (a monovalent heterocyclic group), and a group in which two or more of the aforementioned groups are bonded. The bonded group may be directly bonded or may be bonded via a linking group. Examples of the linking group include an amino group, an ether bond, an ester bond, a phosphinic acid group, a sulfide bond, a carbonyl group, an organic group-substituted amide group, an organic group-substituted urethane bond, an organic group-substituted imide bond, a thiocarbonyl group, a siloxane bond, and a group in which two or more of those listed above are bonded. Examples of the monovalent hydrocarbon group, the monovalent heterocyclic group, and the group in which two or more of the aforementioned groups are bonded include those listed and described as the monovalent organic group in the surface-modifying group (X) (a monovalent organic group bonded to an oxygen atom derived from a polyglycerin-chain terminal hydroxyl group) described above.

Among these, R is preferably a substituted or unsubstituted hydrocarbon group, more preferably an alkyl group, even more preferably an alkyl group having from 1 to 18 carbons, further preferably an alkyl group having from 1 to 6 carbons, and particularly preferably an ethyl group, a butyl group, or a hexyl group. When multiple groups represented by Formula (1) exist in the surface-modifying group (X), each of R in those multiple groups represented by Formula (1) may be the same or different from each other.

The surface-modifying group (X) is preferably a polyglycerin chain-containing surface-modifying group represented by Formula (2) below:

—Y—(C$_3$H$_6$O$_2$)p-(C$_3$H$_5$O$_2$R$^1$)q-OR$^2$  (2)

In Formula (2), p and q each represent an average degree of polymerization for the repeating unit in parentheses, where p is a value of 0 or greater, q is a value of 0 or greater, and p+q is a value of 1 or greater. R$^1$ represents a monovalent organic group. [—OR$^2$] represents a terminal of a polyglycerin chain, where R$^2$ represents a hydrogen atom or a monovalent organic group, and when R$^2$ is a hydrogen atom, q represents a value greater than 0. Y represents a single bond or a divalent group, and the bond extending left from Y is bonded to the ND particle.

[C$_3$H$_6$O$_2$] indicated by "p" in Formula (2) above has one or more of the structures represented by Formulas (3) to (5) below:

—OCH$_2$—CHOH—CH$_2$—  (3)

—OCH(CH$_2$OH)—CH$_2$—  (4)

—OCH$_2$—CH(CH$_2$OH)—  (5)

[C₃H₅O₂R¹] indicated by "q" in Formula (2) above has one or more of the structures represented by Formulas (6) to (8) below.

—OCH₂—CH(OR¹)—CH₂— (6)

—OCH(CH₂OR¹)—CH₂— (7)

—OCH₂—CH(CH₂OR¹)— (8)

In Formula (2) above, p and q each represent an average degree of polymerization (number average degree of polymerization) of the repeating unit in parentheses. p is a value of 0 or greater, q is a value of 1 or greater, and p+q is a value of 1 or greater. When R² is a hydrogen atom, q represents a value greater than 0. p+q is preferably from 1 to 100, more preferably from 2 to 40, and even more preferably from 3 to 30. When p+q is 1 or greater, the steric hindrance between the surface-modifying groups is sufficient, and dispersion in a dispersion medium is facilitated. When p+q is 100 or less, the surface-modifying groups are kept from being entangled, and dispersion in a dispersion medium is facilitated. In addition, properties as a nanodiamond material are less likely to be impaired. Note that [q/(p+q)] is preferably 0.6 or greater, such as from 0.8 to 1.0.

Note that the average degree of polymerization is defined as the number of glycidol units constituting a polyglycerin chain bonded to one surface functional group 1 of the raw material nanodiamond. The number of surface functional groups of the raw material nanodiamond can be determined by carrying out elemental analysis or acid number measurement of the raw material nanodiamond, or by the two techniques in combination.

In Formula (2) above, R¹ represents a monovalent organic group, preferably a group represented by Formula (1) above. Examples of the monovalent organic group of R¹ include those listed and described as the monovalent organic group in the surface-modifying group (X) (a monovalent organic group bonded to an oxygen atom derived from a polyglycerin-chain terminal hydroxyl group) described above.

In Formula (2) above, [—OR²] represents a terminal of a polyglycerin chain, and R² represents a hydrogen atom or a monovalent organic group, preferably a group represented by Formula (1) above. When R² is a monovalent organic group, the multiple R²s in Formula (2) above is preferably the same as each other. Examples of the monovalent organic group of R² include those listed and described as the monovalent organic group in the surface-modifying group (X) (a monovalent organic group bonded to an oxygen atom derived from a polyglycerin-chain terminal hydroxyl group) described above.

In Formula (2), Y represents a single bond or a divalent group, and a bond extending left from Y is bonded to the ND particle. Examples of the divalent group include an amino group (—NH—), an ether bond (—O—), an ester bond (—C(=O)O—), a phosphinic acid group (—PH(=O)O—), a sulfide bond (—S—), a carbonyl group (—C(=O)—), an amide group (—C(=O)—NH—), a urethane bond (—NH—C(=O)—O—), an imide bond (—C(=O)—NH—C(=O)—), a thiocarbonyl group (—C(=S)—), a siloxane bond (—Si—O—), a divalent hydrocarbon group, and a group in which two or more of those listed above are bonded. Examples of the divalent hydrocarbon group include a residue in which one hydrogen atom is removed from the monovalent hydrocarbon group. Furthermore, the divalent group may have a substituent. Examples of the substituent include those listed and described as the substituent that the monovalent organic group may have.

Among these, Y described above is preferably a single bond, —NH—, —O—, —C(=O)O—, —PH(=O)O—, and —S—, and more preferably a single bond.

In Formula (2) above, the order of bonding for the constituent unit indicated by "p" and for the constituent unit indicated by "q" is not particularly limited. That is, the oxygen atom bonded to Y in Formula (2) may be an oxygen atom in the constituent unit indicated by "p", or may be an oxygen atom in the constituent unit indicated by "q". Similarly, the carbon atom in Formula (2) bonded to OR² in Formula (2) may be a carbon atom in the constituent unit indicated by "p", or may be a carbon atom in the constituent unit indicated by "q". In a case where one of p and q has a value of 1 or greater while the other has a value of 2 or greater, the method of bonding the constituent unit indicated by "p" and the constituent unit indicated by "q" may be any of random, alternating, and block. When there are multiple constituent units indicated by "q", each of the multiple R¹ may be the same or different from each other. In a case where each of the multiple R¹ is different from each other, the form of bonding for the constituent unit indicated by "q" may be any of a random, alternating, or block form.

A mass ratio of ND to the surface-modifying group (X) [ND/surface-modifying group (X)] in the surface-modified ND is not limited, but is preferably from 0.5 to 1.0, more preferably from 0.6 to 0.8. When the mass ratio is 0.5 or greater, especially 0.6 or greater, properties as a nanodiamond material are less likely to be impaired. When the mass ratio is 1.0 or less, especially 0.8 or less, the degree of modification of the surface-modifying group (X) is sufficient, and dispersibility in a low-polarity solvent is superior. The mass ratio can be determined based on a weight loss rate as measured by a thermogravimetric analysis, with the weight loss being considered as the mass of the polyglycerin chain-containing surface-modifying group.

As a first aspect, the surface-modified ND preferably has an absorption peak from around 1510 to 1540 cm⁻¹ and an absorption peak from around 1700 to 1730 cm⁻¹ in the FT-IR spectrum. The surface-modified ND having such an absorption peak is presumed to be a surface-modified ND in which X in Formula (1) is —C(=O)—NH—. The absorption peak from around 1510 to 1540 cm⁻¹ is presumed to be a peak originating from the N—H stretching vibration while the absorption peak from around 1700 to 1730 cm⁻¹ is presumed to be a peak originating from the C=O stretching vibration. The absorption peak may vary slightly depending on the R in Formula (1) above.

Furthermore, as a second aspect, the surface-modified ND preferably has an absorption peak from around 1730 to 1750 cm⁻¹ in the FT-IR spectrum. The surface-modified ND having such an absorption peak is presumed to be a surface-modified ND in which X in Formula (1) is —C(=O)—. A strong, sharp absorption peak from around 1730 to 1750 cm⁻¹ is presumed to be a peak originating from the C=O stretching vibration. The absorption peak may vary slightly depending on R in Formula (1) above.

The surface-modified ND preferably has a peak from around 140 to 200 ppm in the ¹³C-NMR spectrum. The surface-modified ND having such a peak is presumed to be a surface-modified ND in which X in Formula (1) above contains a carbonyl carbon such as —C(=O)— or —C(=O)—NH—. Furthermore, the surface-modified ND preferably has a peak from around 60 to 85 ppm in the ¹³C-NMR spectrum. This peak is presumed to be a peak originating from polyglycerin. Furthermore, the surface-modified ND preferably has a peak from around 5 to 45 ppm in the ¹³C-NMR spectrum. The surface-modified ND having such a peak is presumed to be a surface-modified ND in which R in Formula (1) above contains a monovalent aliphatic hydrocarbon group. This peak may vary slightly depending on the R in Formula (1) above.

The surface-modified ND preferably has a median size (D50) from 5 to 100 nm upon dispersing the surface-modified ND in at least one organic dispersion medium having a SP value of 10 $(cal/cm^3)^{1/2}$ or less such that a content ratio of the surface-modified nanodiamond is 0.1 mass %. That is, the median size of the surface-modified ND in at least one organic dispersion medium of organic dispersion media satisfying the above SP value is preferably within the range described above. The median size is more preferably from 5 to 80 nm, even more preferably from 5 to 50 nm. Note that the SP value refers to a Hildebrand solubility parameter ($\delta$) at 25° C. When the median size is within the range described above, the surface-modified ND has superior dispersibility in a low-polarity solvent when compared to a nanodiamond particle having a surface-modifying group containing a polyglycerin chain that has its terminal hydroxyl group with no end-capping.

Specifically, the median size can be determined by adding the organic dispersion medium to the surface-modified ND such that the content ratio of the surface-modified ND reaches 0.1 mass %, performing stirring for 5 minutes in an ultrasonic cleaner, leaving the mixture to stand for 1 day, performing centrifugation for 10 minutes at 20000×g, and measuring the surface-modified ND particles in the supernatant.

Examples of the organic dispersion medium having a SP value of 10 $(cal/cm^3)^{1/2}$ or less include hexane (SP: 7.0), alkylbenzene (SP: 7.6), methyl isobutyl ketone (MIBK, SP: 8.4), toluene (SP: 8.8), tetrahydrofuran (SP: 9.1), ethyl acetate (SP: 9.1), methyl ethyl ketone (MEK; SP: 9.3), chloroform (SP: 9.3), polyol esters (SP: 9.6), methylene chloride (SP: 9.7), dioxane (SP: 9.8), ethylene dichloride (SP: 9.8) acetone (SP: 10.0), poly $\alpha$-olefins (SP: approximately from 6.0 to 8.0), and mineral oils (SP: approximately from 6.0 to 8.0). The SP value is preferably from 7 to 10.0 $(cal/cm^3)^{1/2}$, more preferably from 7.3 to 9.9 $(cal/cm^3)^{1/2}$.

The above surface-modified ND has excellent dispersibility in a low-polarity solvent; furthermore, the polarity of the ND particles can be controlled by adjusting the branched structure of the polyglycerin chain or the length of the polyglycerin chain. As a result, dispersibility in various dispersion media and affinity for resins are achieved. For this reason, the surface-modified ND can be used in the fields of engineering application, such as polishing agents for CMP, dresser materials, corrosion-resistant electrode plating materials for fuel cells, high-hardness surface coating layer forming materials for cutting tools and the like, and high heat-resistance and high thermal-conductivity materials.

The particle size (D50) of the surface-modified ND is, for example, 400 nm or less, preferably 300 nm or less, more preferably 100 nm or less, and even more preferably 50 nm or less. The lower limit of the particle size (D50) of the surface-modified ND is, for example, 5 nm. Furthermore, the particle size (D90) is, for example, 500 nm or less, preferably 180 nm or less, more preferably 170 nm or less. The lower limit of the particle size (D90) of the surface-modified NDs is, for example, 50 nm. A smaller particle size of the surface-modified ND is preferred from the viewpoint of achieving high transparency of the composite material described below. It is noted that the (average) particle size of the surface-modified ND can be measured by a dynamic light scattering method.

Nanodiamond Dispersion Composition

Dispersing the surface-modified ND in a dispersion medium results in a nanodiamond dispersion composition (ND dispersion composition) including a dispersion medium and the surface-modified ND dispersed in the dispersion medium.

The dispersion medium is a medium for dispersing the surface-modified ND, and examples of the dispersion medium include water, an organic solvent, and an ionic liquid. Only one type of dispersion medium may be used, or two or more types of dispersion media may be used.

Examples of the organic solvents include: aliphatic hydrocarbons (especially, linear saturated aliphatic hydrocarbons), such as hexane, heptane, and octane; aromatic hydrocarbons, such as benzene, toluene, and xylene; alicyclic hydrocarbons, such as cyclohexane and methylcyclohexane; aprotic polar solvents, such as dimethylformamide (DMF), dimethylacetamide, N-methylpyrrolidone, and dimethyl sulfoxide; alcohols, such as methanol; halogenated hydrocarbons, such as chloroform, dichloromethane, dichloroethane, carbon tetrachloride, chlorobenzene, and trifluoromethylbenzene; chain or cyclic ethers, such as diethyl ether, diisopropyl ether, dimethoxyethane, tetrahydrofuran (THF), and dioxane; esters, such as ethyl acetate and butyl acetate; chain ketones, such as methyl ethyl ketone (MEK) and methyl isobutyl ketone; and nitriles such as acetonitrile. Among these solvents, from the viewpoint of superior dispersibility of the surface-modified ND, a cyclic ether or a chain ketone is preferred, and a chain ketone is particularly preferred.

A content ratio of ND particles in the ND dispersion composition is not particularly limited, but is, for example, from 0.1 mass ppm to 10 mass %.

The content ratio of the ND particles mentioned above can be calculated from the absorbance at 350 nm. It is noted that in a case where the content ratio of the surface-modified ND is a low concentration (for example, less than or equal to 2000 ppm by mass), a compound in which the ND particles are surface modified by high-frequency inductively-coupled plasma emission spectroscopy (ICP emission spectroscopy) can be detected, and the rate of content can be determined on the basis of the detected amount.

A content ratio of dispersion medium in the ND dispersion composition is, for example, from 90 to 99.9999 mass %. It is to be noted that the upper limit is 100% by mass.

The ND dispersion composition may include only the surface-modified ND and the dispersion medium, or may contain an additional component. Examples of other components include surfactants, thickeners, coupling agents, dispersants, rust inhibitors, corrosion inhibitors, freezing point depressants, anti-foaming agents, anti-wear additives, antiseptics, and colorants. A content ratio of the additional component with respect to the total amount of the ND dispersion composition is, for example, 30 mass % or less, preferably 20 mass % or less, more preferably 10 mass % or less, even more preferably 5 mass % or less, particularly preferably 1 mass % or less. Accordingly, a total content ratio of both the surface-modified ND and the dispersion medium to the total amount of the ND dispersion composition is, for example, 70 mass % or greater, preferably 80 mass % or greater, more preferably 90 mass % or greater, even more preferably 95 mass % or greater, particularly preferably 99 mass % or greater.

The ND dispersion composition contains the surface-modified ND in a highly dispersed state. An average dispersed particle size (D50) of the ND particles in the ND dispersion composition is, for example, 100 nm or less, preferably 60 nm or less, more preferably 50 nm or less, even more preferably 30 nm or less. A lower limit of the average dispersed particle size of the ND particles is, for example, 5 nm.

The ND dispersion composition preferably has a haze value of 5 or less, more preferably 3 or less, even more preferably 1 or less. With the excellent dispersibility of the surface-modified ND in the ND dispersion composition, it is possible to obtain an ND dispersion composition having such a haze value. The haze value can be measured according to JIS K 7136.

The ND dispersion composition can be preferably used, for example, as an additive to composite materials for imparting the characteristics of fine ND particles (such as, for example, mechanical strength, high refractive index, thermal conductivity, insulating properties, antioxidation properties, crystallization promoting action, and dendrite suppressing action) to a resin or the like (such as thermosetting resins, photocurable resins, and thermoplastic resins). In addition, a composition obtained by adding the ND dispersion composition to a resin can be preferably used as, for example, a functional hybrid material, a thermally functional (such as heat resistant, heat storing, thermo-electrically conductive, and heat insulating) material, a photonic material (such as an organic EL element, an LED, a liquid crystal display, and an optical disk), a bio/biocompatible material, a coating material, a film material (such as a hard coating film for a touch screen or various displays, and a thermal barrier film), a sheet material, a screen material (such as a transmission type transparent screen), a filler material (such as a filler for heat radiation or for improving a mechanical property), a heat resistant plastic substrate material (such as a substrate for a flexible display), and a material for a lithium ion battery. Furthermore, the ND dispersion composition can also be used in medical applications, or as a friction-reducing agent or a lubricant applied to a sliding part or the like of a mechanical component (such as, for example, an automobile or an aircraft).

Method for Producing Surface-Modified Nanodiamond and Nanodiamond Dispersion Composition The surface-modified ND can be produced by reacting a surface-modified ND (A) that includes an ND particle and a surface-modifying group having a polyglycerin chain that contains a hydroxyl group, the surface-modifying group surface-modifying the ND particle, with at least one compound selected from the group consisting of an alcohol (B1), an isocyanate ester (B2), and a carboxylic acid chloride (B3).

The surface-modifying group having a polyglycerin chain (polyglycerin chain-containing surface-modifying group) has a hydroxyl group on the polyglycerin chain. The surface-modified ND having a polyglycerin chain-containing surface-modifying group (sometimes referred to as "surface-modified ND [A]") can be obtained, for example, by ring-opening polymerization of glycidol directly on the ND particle. The ND particle include a carboxyl group or a hydroxyl group formed in the production process, and the surface of the ND can be modified with a polyglycerin chain by reacting these functional groups with glycidol.

The reaction between the ND particles and glycidol (ring-opening polymerization) can be carried out, for example, by adding glycidol and a catalyst to the ND particles in an inert gas atmosphere and heating to 50 to 100° C. An acidic catalyst or a basic catalyst can be used as the catalyst. Examples of the acidic catalyst include boron trifluoride etherate, acetic acid, and phosphoric acid. Examples of the basic catalyst include triethylamine, pyridine, dimethylaminopyridine, and triphenylphosphine.

Conditions of ring-opening polymerization of glycidol can be referred to: S. R. Sandler et al., J. Polym. Sci., Polym. Chem. Ed., Vol. 4, 1253 (1966); E. J. Vanderberg, J. Polym. Sci., Polym. Chem. Ed., vol. 23, 915 (1985); and G. R. Newcome et al., Dendritic Macromolecules: Concepts, Syntheses, Perspectives, VCH, Weinheim (1996).

The surface-modified ND (A) can also be obtained by ring-opening polymerization of glycidol on ND particles in which a functional group containing active hydrogen is introduced to the surfaces. The functional group containing active hydrogen is not limited, and examples thereof include an amino group, a hydroxyl group, a carboxyl group, a mercapto group (a thiol group), and a phosphinic acid group. A method for introducing the functional group containing active hydrogen into ND particles can be referred to, for example, JP 2012-82103 A and JP 2010-248023 A. The ring-opening polymerization of glycidol on ND particles in which a functional group containing active hydrogen is introduced to the surfaces can be performed in the same manner as the ring-opening polymerization of glycidol on ND particles described above.

Furthermore, when the alcohol (B1) is used, the surface-modified ND can be obtained by reacting the surface-modified ND (A) with the alcohol (B1) through dehydration condensation to form an ether bond. When the isocyanate ester (B2) is used, the surface-modified ND can be obtained by reacting the surface-modified ND (A) with the isocyanate ester (B2) to add the isocyanate group in isocyanate ester and the aforementioned hydroxyl group and form a urethane bond (carbamoyl group). In addition, when the carboxylic acid chloride (B3) is used, the surface-modified ND can be obtained by reacting the surface-modified ND (A) with the carboxylic acid chloride (B3) and form an ester bond.

The alcohol (B1), the isocyanate ester (B2), and the carboxylic acid chloride (B3) can be selected as appropriate according to the surface-modified ND to be obtained. An organic group bonded to a hydroxyl group in the alcohol (B1), an organic group on a nitrogen atom in the isocyanate ester (B2), and an organic group bonded to a carbonyl group in the carboxylic acid chloride (B3) each corresponds to R in Formula (1) above, and examples thereof include the monovalent organic groups listed and described as R above. One of the alcohol (B1), the isocyanate ester (B2), or the carboxylic acid chloride (B3) may be used alone, or two or more thereof may be used.

The alcohol (B1) is preferably a $C_{1-18}$ alcohol, more preferably ethanol, n-butanol, and n-hexanol.

Among these, the isocyanate ester (B2) is preferably an alkyl isocyanate, more preferably a $C_{1-18}$ alkyl isocyanate, and even more preferably ethyl isocyanate, n-butyl isocyanate, and n-hexyl isocyanate.

Among these, the carboxylic acid chloride (B3) is preferably an acyl chloride, with the acyl group preferably having a $C_{1-19}$ alkyl, and more preferably valeryl chloride.

A reaction with the alcohol, the isocyanate ester, or the carboxylic acid chloride may be performed in a solvent. Examples of the solvent include the organic solvents described above. The reaction can be performed, for example, by adding a catalyst to the ND particles in an inert gas atmosphere and stirring at room temperature. The catalyst is preferably a basic catalyst. Examples of the basic catalyst include a tertiary amine such as triethylamine, pyridine, dimethylaminopyridine, and triphenylphosphine. Note that when the basic catalyst is a liquid, the basic catalyst may be used as the reaction solvent.

A ratio of the surface-modified ND (A) to the alcohol (B1), the isocyanate ester (B2), and/or the carboxylic acid chloride (B3) to be subjected to a reaction (former:latter, mass ratio) is, for example, from 2:1 to 1:80. Furthermore, a concentration of the surface-modified ND (A) in the solvent is, for example, from 0.5 to 10 mass %, and a concentration of the alcohol (B1), the isocyanate ester (B2), and/or the carboxylic acid chloride (B3) in the solvent is, for example, from 5 to 60 mass %.

A reaction time between the surface-modified ND (A) and the alcohol (B1), the isocyanate ester (B2), and/or the carboxylic acid chloride (B3) is, for example, from 4 to 24 hours.

In accordance with the description above, the surface-modified ND, and the ND dispersion composition in which the surface-modified ND is dispersed in a dispersion medium are obtained. It is noted that, in a case where ND agglutinates remain after completion of the reaction, after the liquid formed after the completion of the reaction is left to stand, the supernatant is preferably collected and used as an ND dispersion composition. In addition, when a solvent advantageous for the reaction between the surface-modified ND (A) and the alcohol (B1), the isocyanate ester (B2), and/or the carboxylic acid chloride (B3) is used, the ND dispersion composition can also be produced through replacement of the solvent, which involves obtaining a dispersion of the surface-modified ND particles, distilling off the dispersion medium in the dispersion using an evaporator or the like, and mixing in a new dispersion medium and stirring.

As the ND particles before surface modification, for example, detonation ND (i.e., ND produced by a detonation method) and high temperature and high pressure method ND (i.e., ND produced by a high temperature and high pressure method) can be used. Above all, from the viewpoint of superior dispersibility in the dispersion medium, i.e., from the viewpoint of making the particle diameter of the primary particle be in a single-digit nanometer, a detonation ND is preferred.

The detonation ND mentioned above includes air-cooling detonation ND (i.e., ND produced by an air-cooling detonation method) and water-cooling detonation ND (i.e., ND produced by a water-cooling detonation method). Above all, the air-cooling detonation ND is preferred from the viewpoint of obtaining smaller primary particles compared to the case of the water-cooling detonation ND.

Furthermore, the detonation may be performed in an air atmosphere, or may be performed in an inert gas atmosphere, such as a nitrogen atmosphere, an argon atmosphere, or a carbon dioxide atmosphere.

An example of the method for producing the ND particles to be used in the production method above is described below; however, the ND particles to be used are not limited to those obtained by the following method for producing ND particles.

(Formation)

First, a molded explosive attached with an electric detonator is placed inside a pressure-resistant vessel for detonation, and the vessel is sealed in a state where gas of atmospheric composition at normal pressure and the explosive to be used coexist inside the vessel. The vessel is, for example, made of iron, and the volume of the vessel is, for example, from 0.5 to 40 m$^3$. A mixture of trinitrotoluene (TNT) and cyclotrimethylenetrinitramine, i.e., hexogen (RDX), can be used as the explosive. The mass ratio (TNT/RDX) of TNT to RDX is, for example, in a range from 40/60 to 60/40.

In the formation, the electric detonator is then triggered to detonate the explosive in the vessel. "Detonation" refers to an explosion, among those associated with a chemical reaction, wherein a flame surface where the reaction occurs travels at a high speed exceeding the speed of sound. During the detonation, the explosive that is used undergoes partially incomplete combustion and releases carbon, and the carbon thereof is used as a raw material to produce ND particles through the action of the pressure and energy of the shock waves that are produced in the explosion. Due to Coulomb interaction between crystal planes as well as van der Waals forces between adjacent primary particles or crystallites, the produced ND particles aggregate very firmly to form agglutinates.

In the formation, next, the vessel and its interior are left to stand for approximately 24 hours at room temperature, and are thereby allowed to be cooled. After the cooling, the crude product of ND particles (including the soot and agglutinates of the ND particles formed as described above) adhered to the inner wall of the vessel is scraped off with a spatula, and the crude product of ND particles is thereby collected. A crude product of ND particles (ND particle crude product) can be obtained by the method described above. Furthermore, by implementing the above-described process of forming nanodiamonds several times as necessary, a desired amount of the crude product of ND particles can be obtained.

(Acid Treatment)

In an acid treatment, a strong acid is allowed to act on the crude product of ND particles, which is a raw material, in a solvent of water for example to remove a metal oxide. The ND particle crude product obtained by the detonation method is prone to include a metal oxide, and the metal oxide is an oxide of Fe, Co, Ni, or the like resulting from the vessel or the like used in the detonation method. The metal oxide can be dissolved and removed from the ND particle crude product by allowing a strong acid to act thereon in an aqueous solvent, for example. The strong acid used in the acid treatment is preferably a mineral acid, and examples thereof include hydrochloric acid, hydrofluoric acid, sulfuric acid, nitric acid, and aqua regia. A single kind of the strong acid may be used, or two or more kinds of the strong acids may be used. The concentration of the strong acid used in the acid treatment is, for example, from 1 to 50% by mass. The acid treatment temperature is, for example, from 70 to 150° C. The duration of the acid treatment is, for example, from 0.1 to 24 hours. Furthermore, the acid treatment can be performed under reduced pressure, at atmospheric pressure, or under pressurization. After such an acid treatment, the solid content (containing the nanodiamond agglutinates) is washed with water through decantation for example. The solid is preferably repeatedly washed with water by decantation until the pH of the precipitation solution reaches, for example, 2 to 3. If the content of the metal oxide in the ND particle crude product obtained by the detonation method is small, the acid treatment as described above may be omitted.

(Oxidation Treatment)

The oxidation treatment is a process to remove graphite from the ND particle crude product using an oxidizing agent. The ND particle crude product obtained by the detonation method includes graphite, and this graphite is derived from carbon that did not form ND particle crystals, the carbon thereof being from among the carbon released by partially incomplete combustion of the explosive that is used. The graphite can be removed from the ND particle crude product by allowing an oxidizing agent to act thereon in an aqueous solvent. Furthermore, by allowing the oxidizing agent to act thereon, an oxygen-containing group, such as a carboxyl group or a hydroxyl group, can be introduced onto the ND particle surface.

Examples of the oxidizing agent used in the oxidation treatment include chromic acid, chromic anhydride, dichromic acid, permanganic acid, perchloric acid, nitric acid, and mixtures thereof, a mixed acid of at least one acid selected therefrom and another acid (for example, sulfuric acid), and salts thereof. Among these, a mixed acid (in particular, a mixed acid of sulfuric acid and nitric acid) is preferably used since such a mixed acid is environmentally friendly and exhibits excellent performance in oxidizing and removing graphite.

The mixing ratio of sulfuric acid to nitric acid (the former/the latter, mass ratio) in the above-described mixed acid is preferably, for example, from 60/40 to 95/5 because when the mixing ratio is in that range, the graphite can be efficiently oxidized and removed at, for example, a temperature of 130° C. or higher (particularly preferably 150° C. or higher, and the upper limit being 200° C., for example), even under a pressure near normal pressure (for example, from 0.5 to 2 atm). The lower limit of the mixing ratio is preferably 65/35, and more preferably 70/30. The upper limit of the mixing ratio is preferably 90/10, more preferably 85/15, and still more preferably 80/20. When the mixing ratio is not less than 60/40, the content of sulfuric acid having a high boiling point is high, and therefore the reaction temperature becomes, for example, 120° C. or higher under a pressure near that of normal pressure, and therefore, the efficiency in graphite removal tends to be improved. When the mixing ratio is less than or equal to 95/5, nitric acid that greatly contributes to oxidation of graphite is contained in a larger amount, and thus efficiency in graphite removal tends to be improved.

The usage amount of the oxidizing agent (in particular, the mixed acid) is, for example, from 10 to 50 parts by mass, preferably from 15 to 40 parts by mass, and particularly preferably from 20 to 40 parts by mass, per 1 part by mass of the ND particle crude product. In addition, the usage amount of sulfuric acid in the mixed acid is, for example, from 5 to 48 parts by mass, preferably from 10 to 35 parts by mass, and more preferably from 15 to 30 parts by mass, per 1 part by mass of the ND particle crude product. In addition, the usage amount of nitric acid in the mixed acid is, for example, from 2 to 20 parts by mass, preferably from 4 to 10 parts by mass, and more preferably from 5 to 8 parts by mass, per 1 part by mass of the ND particle crude product.

Furthermore, when the mixed acid is used as the oxidizing agent, a catalyst may be used together with the mixed acid. When the catalyst is used, the removal efficiency of graphite can be further improved. Examples of the catalyst include copper (II) carbonate. The usage amount of the catalyst is, for example, approximately from 0.01 to 10 parts by mass per 100 parts by mass of the ND particle crude product.

The oxidation treatment temperature is, for example, from 100 to 200° C. The duration of the oxidation treatment is, for example, from 1 to 24 hours. The oxidation treatment can be performed under reduced pressure, at atmospheric pressure, or under pressurization.

(Alkali and Hydrogen Peroxide Treatment)

When the metal oxide is not completely removed and remains on the ND particles even after the acid treatment described above, agglutinates (secondary particles) are formed by very strong interaction between primary particles, resulting in aggregation. In such a case, an alkali and a hydrogen peroxide may be allowed to act on the ND particles in an aqueous solvent. Consequently, the metal oxide remaining on the ND particles can be removed, and separation of the primary particles from the agglutinates can be promoted. Examples of the alkali used in this treatment include sodium hydroxide, ammonia, and potassium hydroxide. In alkali and hydrogen peroxide treatment, the concentration of the alkali is, for example, from 0.1 to 10% by mass, the concentration of hydrogen peroxide is, for example, from 1 to 15% by mass, the treatment temperature is, for example, from 40 to 100° C., and the treatment time is, for example, from 0.5 to 5 hours. Furthermore, the alkali and hydrogen peroxide treatment can be performed under reduced pressure, at atmospheric pressure, or under pressurization.

After the above oxidation treatment or alkali and hydrogen peroxide treatment, it is preferable to remove the supernatant by decantation, for example. In addition, in decantation, the solid content is preferably washed with water. The supernatant liquid from the initial washing with water is colored, and thus, the solid content is preferably repeatedly washed with water until the supernatant liquid becomes visually transparent.

(Disintegrating Treatment)

The ND particles may be subjected to a disintegrating treatment as necessary. The disintegrating treatment can be performed using, for example, a high shearing mixer, a high shear mixer, a homomixer, a ball mill, a bead mill, a high pressure homogenizer, an ultrasonic homogenizer, or a colloid mill. It is noted that the disintegration treatment may be performed by a wet process (for example, a disintegration treatment in a state of being suspended in water or the like), or may be performed by a dry process. When the disintegrating treatment is performed by a dry process, drying is preferably performed before the disintegrating treatment. Furthermore, the disintegration treatment may be, in the case of performing the oxidation treatment or the hydrogenation treatment, performed after the treatment.

(Drying)

Drying is preferably performed after the alkali and hydrogen peroxide treatment. For example, a spray drying apparatus or an evaporator, etc., is used to evaporate the liquid content from the ND particle-containing solution obtained through the alkali and hydrogen peroxide treatment, after which the resulting residual solid content is dried by being heated and dried in a drying oven. The temperature for heating and drying is, for example, from 40 to 150° C. Through such drying, ND particles are obtained.

Furthermore, as necessary, the ND particles may be subjected to an oxidation treatment (for example, oxygen oxidation) or a reduction treatment (for example, a hydrogenation treatment) in a gas phase as necessary. By performing an oxidation treatment in the gas phase, ND particles having a large amount of C=O groups on the surface are obtained. In addition, by carrying out a reduction treatment in the gas phase, ND particles having a large amount of C—H groups on the surface are produced.

Each aspect disclosed in the present specification can be combined with any other feature disclosed herein. The configurations, combinations thereof, and the like in each embodiment of the present invention are examples, and various configurational additions, omissions, substitutions, and other changes may be made as appropriate without departing from the spirit of the present invention. Furthermore, inventions according to the present invention are not limited by the embodiments or the following examples, but are limited only by the claims.

EXAMPLES

An embodiment of the present invention will be described in further detail below based on examples.

Example 1

Surface-modified ND particles and a dispersion composition were produced through the following process.
(Production of Surface-Modified ND Particles)

First, the formation of ND by a detonation method was performed. In the present formation, first, a molded explosive attached with an electric detonator was placed inside a pressure-resistant vessel for detonation, and the vessel was sealed. The vessel was made of iron and had a capacity of 15 m$^3$. As the explosive, 0.50 kg of a mixture of TNT and RDX was used. The mass ratio of the TNT and RDX (TNT/RDX) in the explosive was 50/50. The electric detonator was then triggered to detonate the explosive in the vessel (formation of ND by detonation method). Subsequently, the container and its interior were left standing for 24 hours at room temperature, and were thereby cooled. After this cooling, the ND crude product was recovered by scraping with a spatula the ND crude product (including soot and aggregates of the ND particles produced by the detonation method described above) deposited on the inner wall of the container.

The ND crude product formed by performing the formation described above multiple times was then subjected to an acid treatment. Specifically, 6 L of 10 mass % hydrochloric acid was added to 200 g of the ND crude product to prepare a slurry, and the slurry was subjected to a heating treatment for 1 hour under reflux at the normal pressure condition. The heating temperature in this acid treatment was from 85 to 100° C. Next, after cooling, the solid (containing the ND agglutinates and soot) was washed with water by decantation. The solid was repeatedly washed with water by decantation until the pH of the precipitation solution reached 2 from the low pH side.

An oxidation treatment was then performed. Specifically, 6 L of a 98 mass % sulfuric acid and 1 L of a 69 mass % nitric acid were added to the precipitation solution (including ND agglutinates), prepared through decantation after the acid treatment, to prepare a slurry. Then, the slurry was heated under reflux for 48 hours under the normal pressure condition. The heating temperature in this oxidation treatment was from 140 to 160° C. Next, after cooling, the solid (containing the ND agglutinates) was washed with water by decantation. The initial supernatant liquid from the water washing was colored, and therefore washing of the solid content with water by decantation was repeated until the supernatant liquid became visually clear.

Next, the precipitation solution (liquid containing ND agglutinates) obtained through the water-washing treatment described above was subjected to drying to obtain a dry powder (ND agglutinates). Evaporation to dryness performed with the use of an evaporator was employed as a technique for the drying treatment in the drying.

Next, 4.5 g of the dry powder (ND agglutinates) obtained through the drying described above was allowed to stand inside a furnace core tube of a gas atmosphere furnace (trade name "Gas Atmosphere Tube Furnace KTF045N1", available from Koyo Thermo Systems Co., Ltd.), and nitrogen gas was continuously provided through the furnace core tube at a flow rate of 1 L/min for 30 minutes. Then, the flowing gas was switched from nitrogen to a mixed gas of oxygen and nitrogen, and the mixed gas was continuously provided through the furnace core tube at a flow rate of 1 L/min. The oxygen concentration in the mixed gas is 4 vol. %. After switching to the mixed gas, the temperature inside the furnace was raised to a temperature set for heating of 400° C. The temperature was raised at a rate of 10° C./min to 380° C., a temperature 20° C. lower than the temperature set for heating, and then at a rate of 1° C./min from 380° C. to 400° C. Then, the oxygen oxidation treatment was carried out on the ND powder in the furnace while the temperature condition inside the furnace was maintained at 400° C. The duration of the treatment was 3 hours.

Next, hydrogenation was performed using the gas atmosphere furnace described above. Specifically, the ND powder that had been subjected to oxygen oxidation was placed inside the gas atmosphere furnace, and nitrogen gas was continuously provided through at a flow rate of 1 L/minute for 30 minutes. Then, the flowing gas was switched from nitrogen to a mixed gas of hydrogen and nitrogen, and the mixed gas was continuously provided through the furnace core tube at a flow rate of 1 L/minute. The hydrogen concentration in the mixed gas was 2 vol. %. After switching to the mixed gas, the temperature inside the furnace was raised to a temperature set for heating of 600° C. The temperature rising rate was 10° C./minute. Then, hydrogenation treatment was carried out on the ND powder in the furnace while the temperature inside the furnace was maintained at 600° C. The duration of the treatment was 5 hours. An ND powder that had undergone hydrogenation treatment was produced as described above.

The disintegration was then performed. Specifically, first, 0.9 g of the ND powder that had undergone hydrogenation treatment and 29.1 ml of pure water were added to a 50 ml sample bottle and mixed to obtain approximately 30 ml of a slurry. After adjusting the pH to 4 with 1N hydrochloric acid, the slurry was subjected to an ultrasonic treatment. In the ultrasonic treatment, the slurry was subjected to ultrasonic irradiation for 2 hours using an ultrasonic irradiator (trade name "Ultrasonic Cleaner AS-3", available from AS ONE Corporation). Thereafter, bead milling was performed using a bead milling apparatus (trade name "Parallel 4-Tube Sand Grinder Model LSG-4U-2L", available from Aimex Co., Ltd.). Specifically, 30 ml of the slurry after the ultrasonic irradiation and zirconia beads with a diameter of 30 μm were charged in a 100-ml vessel (available from Aimex Co., Ltd.), which was the mill vessel, and the vessel was sealed. Then, the apparatus was operated to perform bead milling. In this bead milling, the amount of zirconia beads that were charged was, for example, 33 vol. % of the capacity of the mill vessel, the rotational speed of the mill vessel was 2570 rpm, and the duration of the milling was 2 hours.

Next, the slurry having undergone the disintegration step as described above was subjected to centrifugation treatment (classification operation) using a centrifuge. The centrifugal force in this centrifugation treatment was 20000×g, and the duration of the centrifugation was 10 minutes. Next, 10 ml of supernatant of the ND-containing solution that had been subjected to this centrifugation treatment was collected. In this manner, an ND dispersion in which nanodiamond was dispersed in pure water was obtained. This nanodiamond dispersion had a solid content concentration of 2.1 mass % and a pH of 5.40. The median size (particle size D50) of the ND dispersion obtained as described above was 35.8 nm.

Next, the ND particle aqueous dispersion obtained through the disintegration described above was dried using an evaporator, resulting in a black dry powder. The resulting dry powder (100 mg) was added to 12 mL of glycidol placed in a glass reactor, ultrasonicated in an ultrasonic cleaner (trade name "BRANSON 2510", available from Marshall Scientific LLC.) at room temperature for 2 hours, and dissolved. This solution was allowed to react at 140° C. for 20 hours while it was being stirred under a nitrogen atmosphere. The reaction mixture was cooled; then, after 120 mL of methanol was added, the reaction mixture was ultrasonicated and then centrifuged at 50400×g for 2 hours, resulting in a precipitate. To this precipitate, 120 mL of methanol was added, and washing-centrifugation was repeated five times in the same manner. Finally, the precipitate was dialyzed with pure water using a dialysis membrane (Spectra/Prodialysis membrane, MWCO of 12 to 14 kDa) to replace the residual methanol with water and was lyophilized, resulting in hydrophilic ND particles modified with polyglycerin (PG-ND particles) as a gray powder. The ratio of ND particle to surface-modifying group measured by a TG-DTA thermal analysis, or ND particle:surface-modifying group, was 1:1.39.

Pyridine was added to the PG-ND gray powder, and the concentration was adjusted to 4 g/L based on the mass of the ND particles, resulting in a PG-ND particle pyridine dispersion. 4 g of ethyl isocyanate was added to 20 ml of the resulted PG-ND particle pyridine dispersion, and the mixture was stirred at room temperature for 30 minutes. Then, 40 ml of hexane was added, and the mixture was centrifuged at 20000×g for 10 minutes to obtain a precipitate. After this washing was repeated three times to remove pyridine, the product was allowed to stand in a vacuum dryer for 24 hours at 50° C. to obtain a dry solid content. As such, a surface-modified nanodiamond in which at least some of the terminal hydroxyl groups in a polyglycerin chain were end-capped with ethyl isocyanate was obtained. The mass ratio [ND/polyglycerin chain-containing surface-modifying group] of the obtained surface-modified nanodiamond particles determined by a thermogravimetric analysis was 0.60.

Tetrahydrofuran was added to the dry solid content obtained above such that the ND content ratio reached 0.1 mass %. Then, the mixture was stirred for 5 minutes using an ultrasonic cleaner and left to stand for one day. In observation of the appearance, it was confirmed that a good dispersion state was maintained. The median size (particle size D50) of the surface-modified nanodiamond particles in the supernatant centrifuged at 20000×g for 10 minutes was 34 nm. The same operation was performed for the case in which methanol was used instead of tetrahydrofuran, and it was confirmed that a good dispersion state was maintained. Meanwhile, the same operation was performed for the case in which ultrapure water was used instead of tetrahydrofuran, and it was confirmed that the nanodiamond aggregated and precipitated.

Example 2

A dry solid (surface-modified nanodiamond in which at least some of the hydroxyl groups in a polyglycerin chain were end-capped with n-butyl isocyanate) was obtained in the same manner as in Example 1 with the exception that 5.6 g of n-butyl isocyanate was used instead of 4 g of ethyl isocyanate. The mass ratio [ND/polyglycerin chain-containing surface-modifying group] of the obtained surface-modified nanodiamond particles determined by a thermogravimetric analysis was 0.74.

Tetrahydrofuran was added to the dry solid content obtained above such that the ND content ratio reached 0.1 mass %. Then, the mixture was stirred for 5 minutes using an ultrasonic cleaner and left to stand for one day. In observation of the appearance, it was confirmed that a good dispersion state was maintained. The median size (particle size D50) of the surface-modified nanodiamond particles in the supernatant centrifuged at 20000×g for 10 minutes was 38 nm. The same operation was performed for the case in which methanol was used instead of tetrahydrofuran, and it was confirmed that a good dispersion state was maintained. Meanwhile, the same operation was performed for the case in which ultrapure water was used instead of tetrahydrofuran, and it was confirmed that the nanodiamond aggregated and precipitated.

Example 3

A dry solid (surface-modified nanodiamond in which at least some of the hydroxyl groups in a polyglycerin chain were end-capped with n-hexyl isocyanate) was obtained in the same manner as in Example 1 with the exception that 7.16 g of n-hexyl isocyanate was used instead of ethyl isocyanate. The mass ratio [ND/polyglycerin chain-containing surface-modifying group] of the obtained surface-modified nanodiamond particles determined by a thermogravimetric analysis was 0.62.

Tetrahydrofuran was added to the dry solid content obtained above such that the ND content ratio reached 0.1 mass %. Then, the mixture was stirred for 5 minutes using an ultrasonic cleaner and left to stand for one day. In observation of the appearance, it was confirmed that a good dispersion state was maintained. The median size (particle size D50) of the surface-modified nanodiamond particles in the supernatant centrifuged at 20000×g for 10 minutes was 42 nm. The same operation was performed for the case in which toluene was used instead of tetrahydrofuran, and it was confirmed that a good dispersion state was maintained. Meanwhile, the same operation was performed for the case in which methanol was used instead of tetrahydrofuran, and it was confirmed that the nanodiamond aggregated and precipitated. Furthermore, the same operation was performed for the case in which ultrapure water was used instead of tetrahydrofuran, and it was confirmed that the nanodiamond aggregated and precipitated.

Example 4

Pyridine was added to the PG-ND gray powder obtained in Example 1, and the concentration was adjusted to 2 g/L based on the mass of the ND particles, resulting in a PG-ND particle pyridine dispersion. 4.8 g of valeryl chloride was added to 40 ml of the resulted PG-ND particle pyridine dispersion, and the mixture was stirred at 60° C. for 24 hours. Next, 80 ml of ultrapure water was added, and the mixture was centrifuged at 6000×g for 5 minutes to remove the supernatant. Then, 40 ml of methanol was added and stirred, and the mixture was centrifuged at 20000×g for 10 minutes to wash the precipitate. After this washing was repeated three times to remove pyridine, the product was allowed to stand in a vacuum dryer for 24 hours at 50° C. to obtain a dry solid content. As such, a surface-modified nanodiamond in which at least some of the terminal hydroxyl groups in a polyglycerin chain were end-capped with a carboxylate was obtained. The mass ratio [ND/polyglycerin chain-containing surface-modifying group] of the obtained surface-modified nanodiamond particles determined by a thermogravimetric analysis was 0.61.

Tetrahydrofuran was added to the dry solid content obtained above such that the ND content ratio reached 0.1 mass %. Then, the mixture was stirred for 5 minutes using an ultrasonic cleaner and left to stand for one day. In observation of the appearance, it was confirmed that a good dispersion state was maintained. The median size (particle size D50) of the surface-modified nanodiamond particles in the supernatant centrifuged at 20000×g for 10 minutes was 38 nm. The same operation was performed for the case in which toluene was used instead of tetrahydrofuran, and it was confirmed that a good dispersion state was maintained. Meanwhile, the same operation was performed for the case in which methanol was used instead of tetrahydrofuran, and it was confirmed that the nanodiamond aggregated and precipitated. Furthermore, the same operation was performed for the case in which ultrapure water was used instead of tetrahydrofuran, and it was confirmed that the nanodiamond aggregated and precipitated.

Example 5

Pyridine was added to the PG-ND gray powder obtained in Example 1, and the concentration was adjusted to 2 g/L based on the mass of the ND particles, resulting in a PG-ND particle pyridine dispersion. 5.5 g of heptanoyl chloride was added to 40 ml of the resulted PG-ND particle pyridine dispersion, and the mixture was stirred at 60° C. for 24 hours. Next, 80 ml of methanol was added, and the mixture was centrifuged at 6000×g for 5 minutes to remove the supernatant. Then, 40 ml of methanol was added and stirred, and the mixture was centrifuged at 20000×g for 10 minutes to wash the precipitate. After this washing was repeated three times to remove pyridine, the product was allowed to stand in a vacuum dryer for 24 hours at 50° C. to obtain a dry solid content. As such, a surface-modified nanodiamond in which at least some of the terminal hydroxyl groups in a polyglycerin chain were end-capped with a carboxylate was obtained. The mass ratio [ND/polyglycerin chain-containing surface-modifying group] of the obtained surface-modified nanodiamond particles determined by a thermogravimetric analysis was 0.68.

Tetrahydrofuran was added to the dry solid content obtained above such that the ND content ratio reached 0.1 mass %. Then, the mixture was stirred for 5 minutes using an ultrasonic cleaner and left to stand for one day. In observation of the appearance, it was confirmed that a good dispersion state was maintained. The median size (particle size D50) of the surface-modified nanodiamond particles in the supernatant centrifuged at 20000×g for 10 minutes was 27.5 nm. The same operation was performed for the case in which toluene was used instead of tetrahydrofuran, and it was confirmed that a good dispersion state was maintained. Furthermore, the same operation was performed for the case in which hexane was used instead of tetrahydrofuran, and it was confirmed that a good dispersion state was maintained. Meanwhile, the same operation was performed for the case in which methanol was used instead of tetrahydrofuran, and it was confirmed that the nanodiamond aggregated and precipitated. Furthermore, the same operation was performed for the case in which ultrapure water was used instead of tetrahydrofuran, and it was confirmed that the nanodiamond aggregated and precipitated.

Comparative Example 1

Tetrahydrofuran was added to the PG-ND gray powder such that the ND solid content reached 0.1 mass %. Then, the mixture was stirred for 5 minutes using an ultrasonic cleaner and left to stand for one day. In observation of the appearance, it was confirmed that the nanodiamond aggregated and precipitated. Meanwhile, the same operation was performed for the case in which methanol was used instead of tetrahydrofuran, and it was found that the nanodiamond maintained a good dispersion state. Furthermore, the same operation was performed for the case in which ultrapure water was used instead of tetrahydrofuran, and it was found that the nanodiamond maintained a good dispersion state.

Particle Size D50

The median sizes (particle sizes D50) of ND particles in the ND dispersion compositions of the examples, obtained as described above, were measured based on the nanodiamond particle size distributions obtained by a dynamic light scattering method. Specifically, the nanodiamond particle size distributions were measured by a dynamic light scattering method (non-contact backscattering method) with the use of an instrument (trade name "Zetasizer Nano ZS") available from Malvern Panalytical Ltd.

Thermogravimetric Analysis

A sample (approximately 3 mg) was heated in an air atmosphere at a temperature rising rate of 20° C./minute using a TG/DTA (thermogravimetric-differential thermal analysis) device (trade name "EXSTAR6300", available from SII Technology), and the weight loss was measured. Alumina was used as the reference material.

FT-IR Analysis

FT-IR measurements were performed on the surface-modified nanodiamonds obtained in Examples 1 to 5 and Comparative Example 1 using a device in which a heated vacuum agitation reflection "Heat Chamber Type-1000° C." (available from S.T. Japan Inc.) was attached to a Fourier transform infrared spectrometer "IRTracer" (available from Shimadzu Corporation). Note that in order to remove the adsorbed water of the ND particles, the FT-IR measurements were performed after heating for 10 minutes at 150° C. under a vacuum of $2\times10^{-3}$ Pa.

Figure 2:
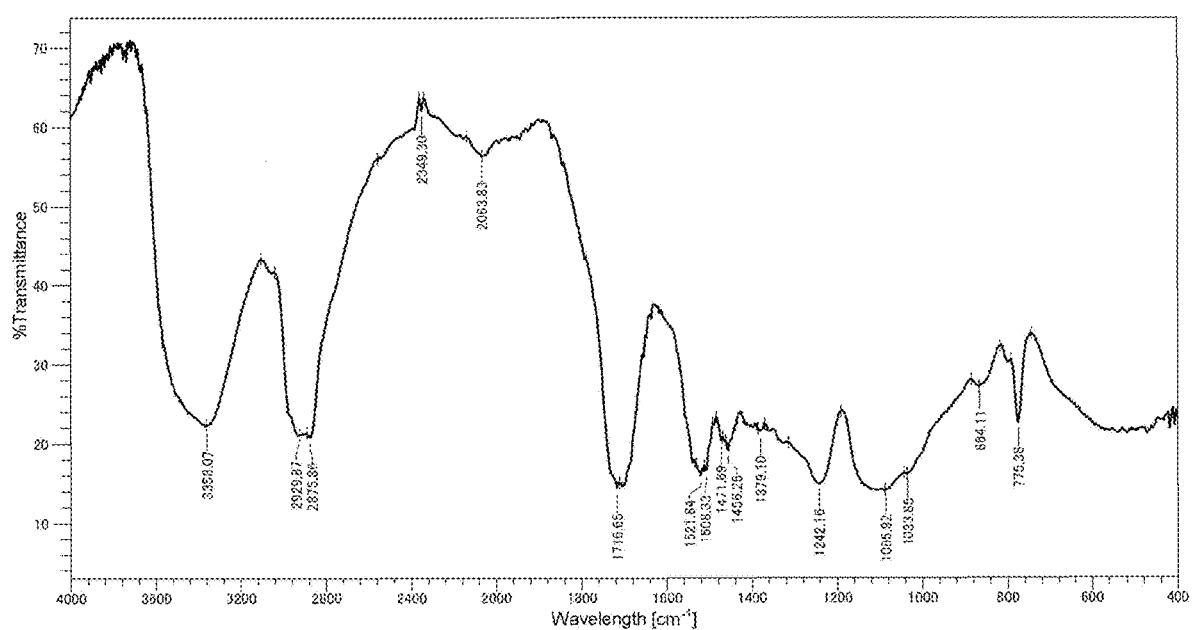
FIG. 2 is a diagram showing an FT-IR spectrum of a surface-modified nanodiamond obtained in Example 1.
Figure 3:
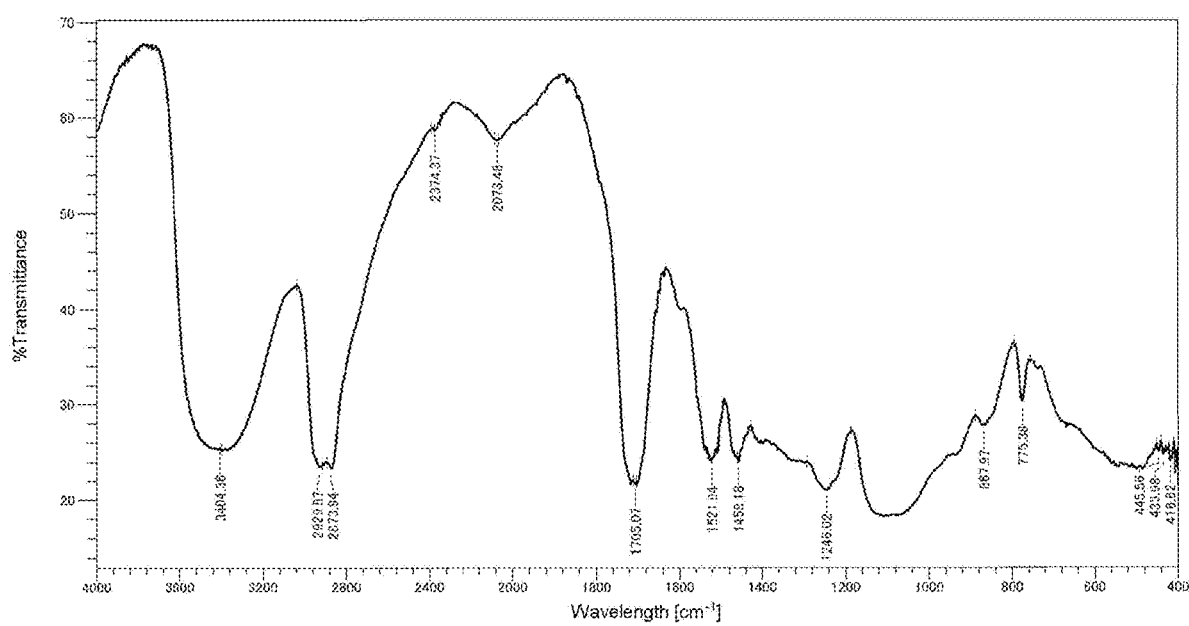
FIG. 3 is a diagram showing an FT-IR spectrum of a surface-modified nanodiamond obtained in Example 2.
Figure 4:
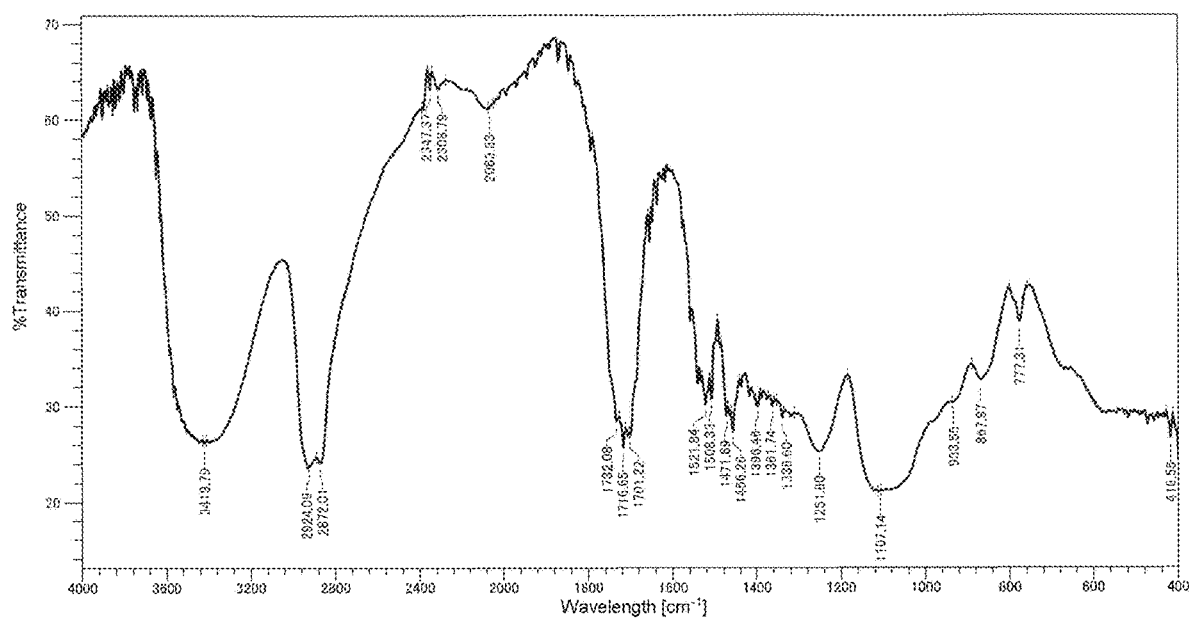
FIG. 4 is a diagram showing an FT-IR spectrum of a surface-modified nanodiamond obtained in Example 3.
Figure 5:
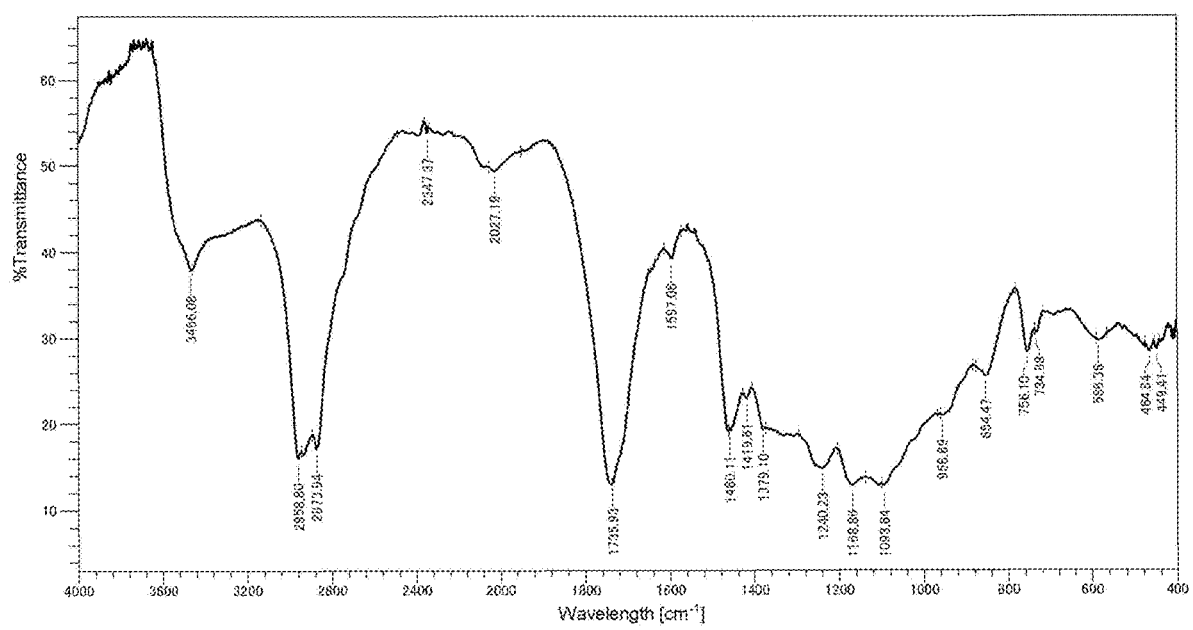
FIG. 5 is a diagram showing an FT-IR spectrum of a surface-modified nanodiamond obtained in Example 4.
Figure 6:
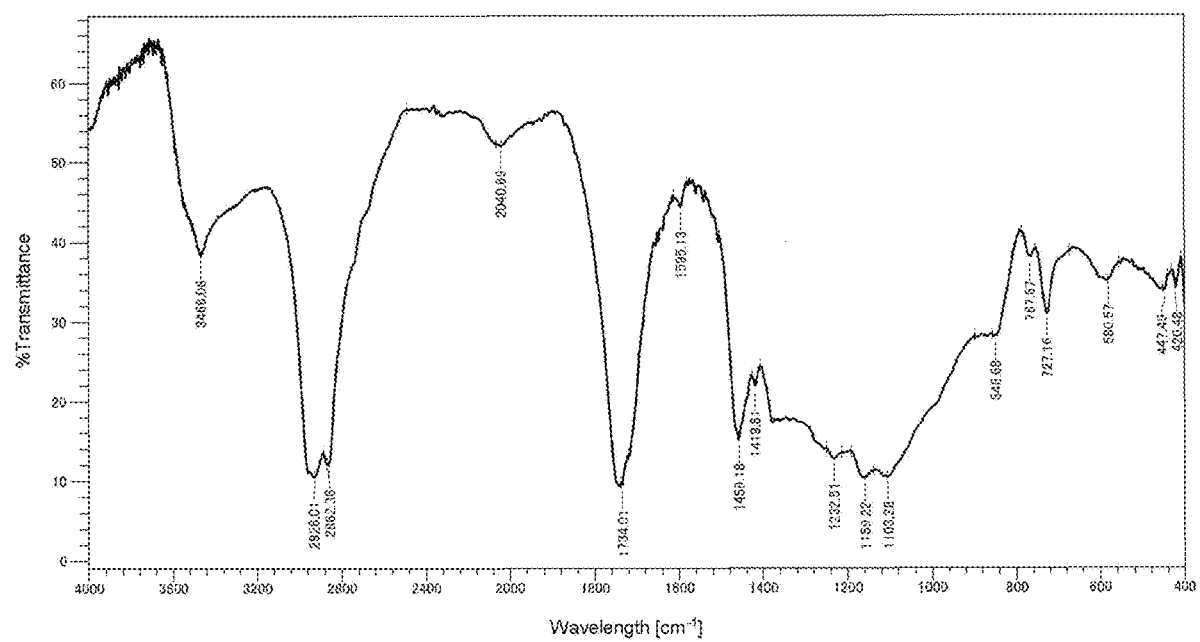
FIG. 6 is a diagram showing an FT-IR spectrum of a surface-modified nanodiamond obtained in Example 5.
Figure 7:
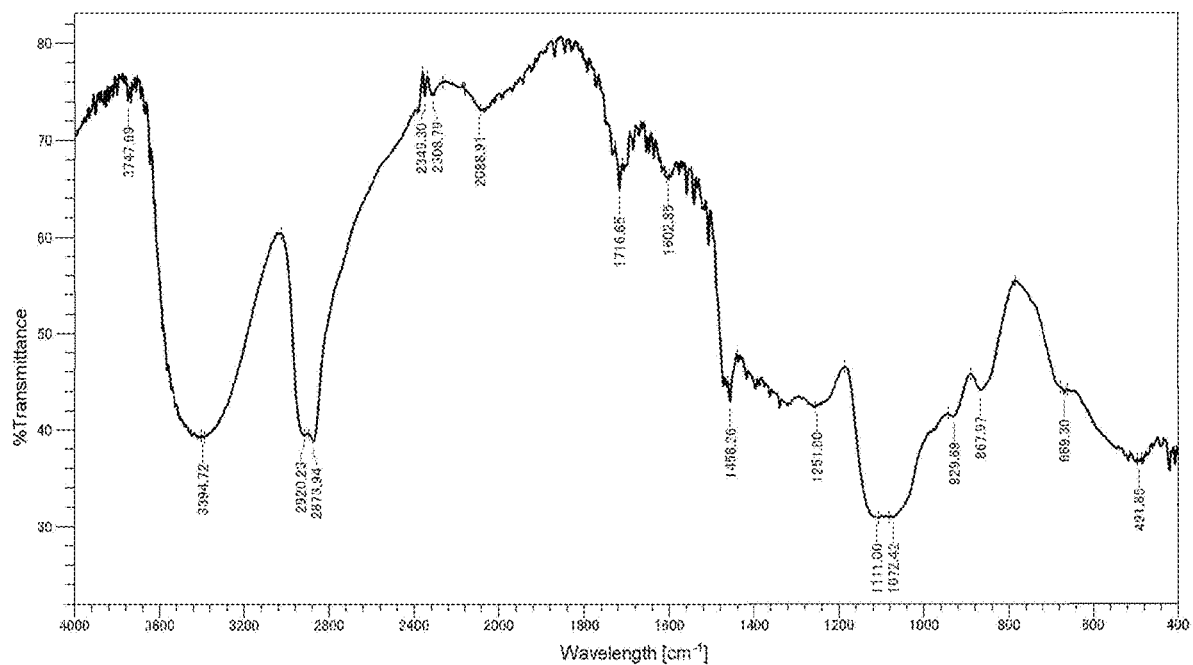
FIG. 7 is a diagram showing an FT-IR spectrum of a nanodiamond obtained in Comparative Example 1.

The FT-IR spectrum of the surface-modified nanodiamond obtained in Example 1 is shown in FIG. 2. The FT-IR spectrum of the surface-modified nanodiamond obtained in Example 2 is shown in FIG. 3. The FT-IR spectrum of the surface-modified nanodiamond obtained in Example 3 is shown in FIG. 4. The FT-IR spectrum of the surface-modified nanodiamond obtained in Example 4 is shown in FIG. 5. The FT-IR spectrum of the surface-modified nanodiamond obtained in Example 5 is shown in FIG. 6. The FT-IR spectrum of the surface-modified nanodiamond obtained in Comparative Example 1 is shown in FIG. 7. In Examples 1 to 3, a C=O peak originating from urethane bonds from around 1705 to 1717 $cm^{-1}$ and an N—H peak originating from urethane bonds at around 1521 $cm^{-1}$ were observed. As such, it is presumed that Examples 1 to 3 yielded nanodiamonds in which a carbamoyl bond, derived from isocyanate ester and a hydroxyl group on a polyglycerin chain, was formed. The characteristic peaks observed in the surface-modified nanodiamonds obtained in Examples 1 to 3 were not observed in the nanodiamond obtained in Comparative Example 1. Also, in Example 4, a strong C=O peak originating from ester bonds at around 1736 $cm^{-1}$ was observed; meanwhile, in Example 5, a strong C=O peak originating from ester bonds at around 1734 $cm^{-1}$ was observed. The strong, sharp C=O peaks observed in Examples 4 and 5 were not observed in the nanodiamond obtained in Comparative Example 1.

$^{13}$C-NMR Analysis

The surface-modified nanodiamond obtained in Example 2 was subjected to a $^{13}$C-NMR analysis. Specifically, the dry powder of the surface-modified nanodiamond and the hydrophilic ND particles modified with polyglycerin (PG-ND) obtained in Example 2 were dispersed in DMSO-d6 (0.3% tetramethylsilane) using an ultrasonic cleaner, and then the $^{13}$C-NMR spectrum was measured using a Brucker AVANCE (600 MHz). Note that the measurement was performed at 25° C., and the number of integrations was 200000 times.

Figure 8:
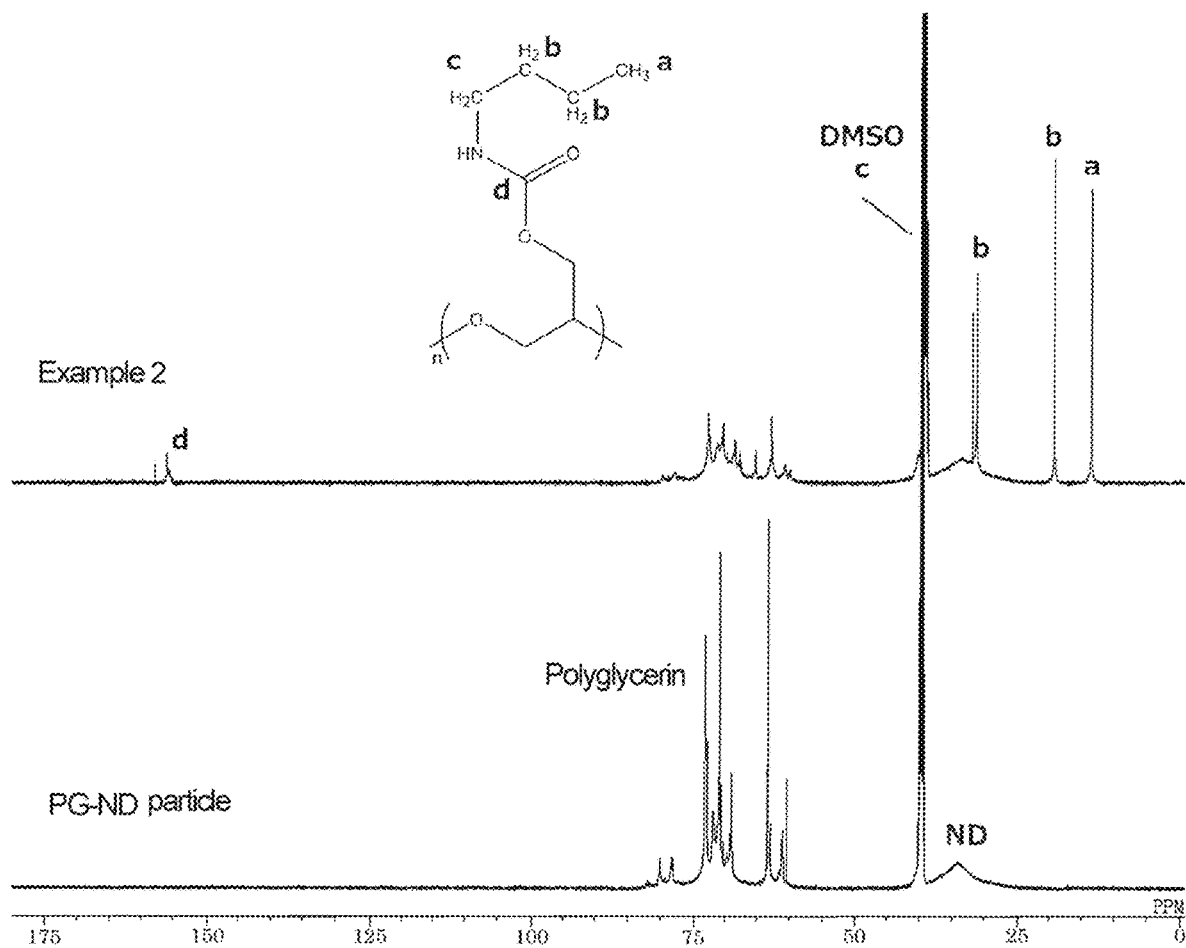
FIG. 8 is a diagram showing a $^{13}$C-NMR spectrum of the surface-modified nanodiamond obtained in Example 2.

The $^{13}$C-NMR spectrum of the surface-modified nanodiamond obtained in Example 2 is shown in FIG. 8. In Example 2, a peak "a" from around 13 to 14 ppm and peak "b" from around 19 to 20 ppm and from around 31 to 32 ppm were observed. These peaks were originated from hydroxyl groups on a polyglycerin chain end-capped with an alkyl chain. In addition, a peak d originating from the C=O groups due to the hydroxyl groups on the polyglycerin chain being end-capped with alkyl isocyanate was observed from around 155 to 157 ppm. Meanwhile, only peaks from around 58 to 82 ppm originating from polyglycerin chains and from around 24 to 38 ppm originating from nanodiamond were observed in the $^{13}$C-NMR spectrum of the hydrophilic ND particles modified with polyglycerin (PG-ND particles).

Variations of the invention according to the present invention will be described below.

[Appendix 1] A surface-modified nanodiamond including a nanodiamond particle and a surface-modifying group that surface-modifies the nanodiamond particle, the surface-modifying group having a polyglycerin chain in which a hydrogen atom of at least one hydroxyl group in the polyglycerin chain is substituted by a monovalent organic group.

[Appendix 2] The surface-modified nanodiamond according to Appendix 1, wherein the polyglycerin chain is bonded to the nanodiamond particle via a single bond or a divalent group.

[Appendix 3] The surface-modified nanodiamond according to Appendix 2, wherein the divalent group is an amino group (—NH—), an ether bond (—O—), an ester bond (—C(=O)O—), a phosphinic acid group (—PH(=O)O—), a sulfide bond (—S—), a carbonyl group (—C(=O)—), an amide group (—C(=O)—NH—), a urethane bond (—NH—C(=O)—O—), an imide bond (—C(=O)—NH—C(=O)—), a thiocarbonyl group (—C(=S)—), a siloxane bond (—Si—O—), a divalent hydrocarbon group, or a group in which two or more of those listed above are bonded (preferably a single bond, —NH—, —O—, —C(=O)O—, —PH(=O)O—, or —S—, more preferably a single bond).

[Appendix 4] The surface-modified nanodiamond according to any one of Appendices 1 to 3, wherein the monovalent organic group is a group represented by Formula (1):

—X—R (1)

wherein in Formula (1), X represents a single bond, —C(=O)—, or —C(=O)—NH—; R represents a monovalent organic group, and an atom bonded to X is a carbon atom.

[Appendix 5] The surface-modified nanodiamond according to Appendix 4, wherein R is a substituted or unsubstituted hydrocarbon group (preferably an alkyl group, more preferably an alkyl group having from 1 to 18 carbons, even more preferably an alkyl group having from 1 to 6 carbons, and particularly preferably an ethyl group, a butyl group, or a hexyl group).

[Appendix 6] The surface-modified nanodiamond according to any one of Appendices 1 to 5, wherein the surface-modifying group is a polyglycerin chain-containing surface-modifying group represented by Formula (2):

—Y—(C$_3$H$_6$O$_2$)p-(C$_3$H$_5$O$_2$R$^1$)q-OR$^2$ (2)

wherein in Formula (2), p and q each represent an average degree of polymerization for a repeating unit in parentheses, where p is a value of 0 or greater, q is a value of 0 or greater, and p+q is a value of 1 or greater (preferably from 1 to 100, more preferably from 2 to 40, and even more preferably from 3 to 30); R$^1$ represents a monovalent organic group; [—OR$^2$] represents a terminal of a polyglycerin chain, where R$^2$ represents a hydrogen atom or a monovalent organic group, and when R$^2$ is a hydrogen atom, q represents a value greater than 0; Y represents a single bond or a divalent group (preferably a single bond, —NH—, —O—, —C(=O)O—, —PH(=O)O—, or —S—, more preferably a single bond), and a bond extending left from Y is bonded to the nanodiamond particle; an oxygen atom bonded to Y in Formula (2) may be an oxygen atom in a constituent unit indicated by "p", or may be an oxygen atom in a constituent unit indicated by "q"; a carbon atom in Formula (2) bonded to OR$^2$ in Formula (2) may be a carbon atom in a constituent unit indicated by "p", or may be a carbon atom in the constituent unit indicated by "q".

[Appendix 7] The surface-modified nanodiamond according to Appendix 6, wherein [q/(p+q)] in Formula (2) is 0.6 or greater (preferably from 0.8 to 1.0).

[Appendix 8] The surface-modified nanodiamond according to Appendix 4 or Appendix 5, wherein R in Formula (1) represents an alkyl group.

[Appendix 9] The surface-modified nanodiamond according to Appendix 4 or Appendix 5, wherein R in Formula (1) represents an alkyl group having from 1 to 18 carbons.

[Appendix 10] The surface-modified nanodiamond according to Appendix 4 or Appendix 5, wherein R in Formula (1) represents an ethyl group, a butyl group, or a hexyl group.

[Appendix 11] The surface-modified nanodiamond according to any one of Appendices 1 to 10, wherein a mass ratio of the nanodiamond particle to the surface-modifying group [nanodiamond particle/surface-modifying group] in the surface-modified nanodiamond is from 0.5 to 1.0 (preferably from 0.6 to 0.8).

[Appendix 12] The surface-modified nanodiamond according to any one of Appendices 1 to 11, having an absorption peak from around 1510 to 1540 cm$^{-1}$ and an absorption peak from around 1700 to 1730 cm$^{-1}$ in an FT-IR spectrum.

[Appendix 13] The surface-modified nanodiamond according to any one of Appendices 1 to 11, having an absorption peak from around 1730 to 1750 cm$^{-1}$ in an FT-IR spectrum.

[Appendix 14] The surface-modified nanodiamond according to any one of Appendices 1 to 13, having a peak from around 60 to 85 ppm in a $^{13}$C-NMR spectrum.

[Appendix 15] The surface-modified nanodiamond according to any one of Appendices 1 to 14, having a peak from around 140 to 200 ppm in a $^{13}$C-NMR spectrum.

[Appendix 16] The surface-modified nanodiamond according to any one of Appendices 1 to 15, having a peak from around 5 to 45 ppm in a $^{13}$C-NMR spectrum.

[Appendix 17] The surface-modified nanodiamond according to any one of Appendices 1 to 16, having a median size from 5 to 100 nm (preferably from 5 to 80 nm, more preferably from 5 to 50 nm) upon dispersing the surface-modified nanodiamond in at least one organic dispersion medium having a Hildebrand solubility parameter (δ) of 10 (cal/cm$^3$)$^{1/2}$ or less such that a content ratio of the surface-modified nanodiamond is 0.1 mass %.

[Appendix 18] The surface-modified nanodiamond according to any one of Appendices 1 to 17, wherein a particle size (D50) of the surface-modified nanodiamond is 400 nm or less (preferably 300 nm or less, more preferably 100 nm or less, even more preferably 50 nm or less).

[Appendix 19] The surface-modified nanodiamond according to any one of Appendices 1 to 18, wherein a particle size (D90) of the surface-modified nanodiamond is 500 nm or less (preferably 180 nm or less, more preferably 170 nm or less).

[Appendix 20] The surface-modified nanodiamond according to any one of Appendices 1 to 19, wherein the nanodiamond particle includes a nanodiamond obtained by a detonation method (preferably, a nanodiamond obtained by an air-cooling detonation method).

[Appendix 21] A nanodiamond dispersion composition including a dispersion medium and the surface-modified nanodiamond described in any one of Appendices 1 to 20, the surface-modified nanodiamond being dispersed in the dispersion medium.

[Appendix 22] The nanodiamond dispersion composition according to Appendix 21, wherein the dispersion medium contains a cyclic ether or a chain ketone (preferably a chain ketone).

[Appendix 23] The nanodiamond dispersion composition according to Appendix 21 or Appendix 22, wherein a content ratio of a nanodiamond particle in the nanodiamond dispersion composition is from 0.1 mass ppm to 10 mass %.

[Appendix 24] The nanodiamond dispersion composition according to any one of Appendices 21 to 23, wherein a content ratio of the dispersion medium in the nanodiamond dispersion composition is from 90 to 99.9999 mass %.

[Appendix 25] The nanodiamond dispersion composition according to any one of Appendices 21 to 24, wherein a total content ratio of the surface-modified nanodiamond and the dispersion medium with respect to a total amount of the nanodiamond dispersion composition is 70 mass % or greater (preferably 80 mass % or greater, more preferably 90 mass % or greater, even more preferably 95 mass % or greater, particularly preferably 99 mass % or greater).

[Appendix 26] The nanodiamond dispersion composition according to any one of Appendices 21 to 25, wherein an average dispersed particle size (D50) of the nanodiamond particle in the nanodiamond dispersion composition is 100 nm or less (preferably 60 nm or less, more preferably 50 nm or less, even more preferably 30 nm or less).

[Appendix 27] The nanodiamond dispersion composition according to any one of Appendices 21 to 26, wherein a haze value of the nanodiamond dispersion composition is 5 or less (preferably 3 or less, more preferably 1 or less).

[Appendix 28] A method of producing the surface-modified nanodiamond according to any one of Appendices 1 to 20 including: reacting a surface-modified nanodiamond (A) with at least one compound selected from the group consisting of an alcohol (B1), an isocyanate ester (B2), and a carboxylic acid chloride (B3), the surface-modified nanodiamond (A) including a nanodiamond particle and a surface-modifying group that surface-modifies the nanodiamond particle, the surface-modifying group having a polyglycerin chain that contains a hydroxyl group.

[Appendix 29] The method of producing the surface-modified nanodiamond according to Appendix 28, wherein the alcohol (B1) includes a $C_{1-18}$ alcohol (preferably ethanol, n-butanol, and n-hexanol).

[Appendix 30] The method of producing the surface-modified nanodiamond according to Appendix 28, wherein the isocyanate ester (B2) includes an alkyl isocyanate (preferably a $C_{1-18}$ alkyl isocyanate, and more preferably ethyl isocyanate, n-butyl isocyanate, and n-hexyl isocyanate).

[Appendix 31] The method of producing the surface-modified nanodiamond according to Appendix 28, wherein the carboxylic acid chloride (B3) includes an acyl chloride (preferably an acyl chloride in which the acyl group has a $C_{1-19}$ alkyl, more preferably valeryl chloride).

[Appendix 32] The method of producing the surface-modified nanodiamond according to any one of Appendices 28 to 31, wherein a ratio of the surface-modified nanodiamond (A) to the alcohol (B1), the isocyanate ester (B2), and/or the carboxylic acid chloride (B3) to be subjected to a reaction (former:latter, in mass ratio) is from 2:1 to 1:80.

[Appendix 33] The method of producing the surface-modified nanodiamond according to any one of Appendices 28 to 32, wherein a nanodiamond in the surface-modified nanodiamond (A) includes a nanodiamond obtained by a detonation method (preferably, a nanodiamond obtained by an air-cooling detonation method).

REFERENCE SIGNS LIST

1 Surface-modified nanodiamond
2 Nanodiamond particle
3 Surface-modifying group (X)
4 Polyglycerin chain

The invention claimed is:

1. A surface-modified nanodiamond comprising a nanodiamond particle and a surface-modifying group that surface-modifies the nanodiamond particle, the surface-modifying group having a polyglycerin chain in which a hydrogen atom of at least one hydroxyl group in the polyglycerin chain is substituted by a monovalent organic group,
wherein the monovalent organic group is a group represented by Formula (1):

where in Formula (1), X represents —C(=O)— or —C(=O)—NH—; R represents a monovalent organic group; and an atom bonded to X is a carbon atom.

2. The surface-modified nanodiamond according to claim 1, wherein the polyglycerin chain is bonded to the nanodiamond particle via a single bond or a divalent group.

3. The surface-modified nanodiamond according to claim 2, wherein the divalent group is an amino group (—NH—), an ether bond (—O—), an ester bond (—C(=O)O—), a phosphinic acid group (—PH(=O)O—), a sulfide bond (—S—), a carbonyl group (—C(=O)—), an amide group (—C(=O)—NH—), a urethane bond (—NH—C(=O)—O—), an imide bond (—C(=O)—NH—C(=O)—), a thiocarbonyl group (—C(=S)—), a siloxane bond (—Si—O—), a divalent hydrocarbon group, or a group in which two or more of those listed above are bonded (preferably a single bond, —NH—, —O—, —C(=O)O—, —PH(=O)O—, or —S—).

4. The surface-modified nanodiamond according to claim 1, wherein the surface-modifying group having a polyglycerin chain in which a hydrogen atom of at least one hydroxyl group in the polyglycerin chain is substituted by a monovalent organic group represented by Formula (1) is represented by Formula (2):

where in Formula (2), p and q each represent an average degree of polymerization for a repeating unit in parentheses, where p is a value of 0 or greater, q is a value of 0 or greater, and p+q is a value of 1 or greater;

$R^1$ represents a monovalent organic group;

[—$OR^2$] represents a terminal of a polyglycerin chain, where $R^2$ represents a hydrogen atom or a monovalent organic group, and when $R^2$ is a hydrogen atom, q represents a value greater than 0; and Y represents a single bond or a divalent group, and a bond extending left from Y is bonded to an ND particle.

5. The surface-modified nanodiamond according to claim 1, wherein in Formula (1), R represents an alkyl group.

6. The surface-modified nanodiamond according to claim 1, wherein in Formula (1), R represents an alkyl group having from 1 to 18 carbons.

7. The surface-modified nanodiamond according to claim 1, wherein in Formula (1), R represents an ethyl group, a butyl group, or a hexyl group.

8. The surface-modified nanodiamond according to claim 1, having an absorption peak from around 1510 to 1540 $cm^{-1}$ and an absorption peak from around 1700 to 1730 $cm^{-1}$ in an FT-IR spectrum.

9. The surface-modified nanodiamond according to claim 1, having an absorption peak from around 1730 to 1750 $cm^{-1}$ in an FT-IR spectrum.

10. The surface-modified nanodiamond according to claim 1, having a median size from 5 to 100 nm upon dispersing the surface-modified nanodiamond in at least one organic dispersion medium having a Hildebrand solubility parameter ($\delta$) of 10 $(cal/cm^3)^{1/2}$ or less such that a content ratio of the surface-modified nanodiamond is 0.1 mass %.

11. The surface-modified nanodiamond according to claim 1, wherein a mass ratio of the nanodiamond particle to the surface-modifying group in the surface-modified nanodiamond is from 0.5 to 1.0.

12. The surface-modified nanodiamond according to claim 1, wherein a particle size (D50) of the surface-modified nanodiamond is 400 nm or less.

13. The surface-modified nanodiamond according to claim 1, wherein the nanodiamond particle includes a nanodiamond obtained by a detonation method.

14. A method of producing the surface-modified nanodiamond according to claim 1, the method comprising reacting a surface-modified nanodiamond (A) with at least one compound selected from the group consisting of an alcohol (B1), an isocyanate ester (B2), and a carboxylic acid chloride (B3), the surface-modified nanodiamond (A) including a nanodiamond particle and a surface-modifying group that surface-modifies the nanodiamond particle, the surface-modifying group having a polyglycerin chain that contains a hydroxyl group.

15. A nanodiamond dispersion composition including a dispersion medium and the surface-modified nanodiamond described in claim 1, the surface-modified nanodiamond being dispersed in the dispersion medium.

16. The nanodiamond dispersion composition according to claim 15, wherein the dispersion medium contains a cyclic ether or a chain ketone.

17. The nanodiamond dispersion composition according to claim 15, wherein a content ratio of a nanodiamond particle in the nanodiamond dispersion composition is from 0.1 mass ppm to 10 mass %.

18. The nanodiamond dispersion composition according to claim 15, wherein an average dispersed particle size (D50) of the nanodiamond particle in the nanodiamond dispersion composition is 100 nm or less.

19. The nanodiamond dispersion composition according to claim 15, wherein a haze value of the nanodiamond dispersion composition is 5 or less.

* * * * *